United States Patent
Deguchi et al.

(10) Patent No.: US 12,554,401 B2
(45) Date of Patent: Feb. 17, 2026

(54) STORAGE SYSTEM, COMPUTER SYSTEM, AND CONTROL METHOD FOR STORAGE SYSTEM

(71) Applicant: Hitachi, Ltd., Tokyo (JP)

(72) Inventors: Akira Deguchi, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/547,116

(22) Filed: Dec. 9, 2021

(65) Prior Publication Data

US 2022/0100387 A1 Mar. 31, 2022

Related U.S. Application Data

(63) Continuation of application No. 16/433,780, filed on Jun. 6, 2019, now Pat. No. 11,199,973, which is a
(Continued)

(51) Int. Cl.
| | |
|---|---|
| *G06F 3/06* | (2006.01) |
| *G06F 11/14* | (2006.01) |
| *G06F 11/1446* | (2026.01) |
| *G06F 11/1471* | (2026.01) |
| *G06F 11/16* | (2006.01) |

(Continued)

(52) U.S. Cl.
CPC .......... *G06F 3/0611* (2013.01); *G06F 3/0619* (2013.01); *G06F 3/065* (2013.01); *G06F 3/067* (2013.01); *G06F 11/14* (2013.01); *G06F 11/1451* (2013.01); *G06F 11/1471* (2013.01); *G06F 11/16* (2013.01); *G06F 11/2094* (2013.01); *G06F 11/2097* (2013.01); *G06F 12/00* (2013.01); *G06F 2201/815* (2013.01)

(58) Field of Classification Search
CPC ...... G06F 3/0611; G06F 3/0619; G06F 3/065; G06F 3/067; G06F 11/14; G06F 11/16; G06F 12/00
See application file for complete search history.

(56) References Cited

U.S. PATENT DOCUMENTS

| | | | |
|---|---|---|---|
| 8,341,115 B1 | 12/2012 | Natanzon et al. | |
| 8,433,869 B1 * | 4/2013 | Natanzon ............ | G06F 11/1471 707/634 |

(Continued)

FOREIGN PATENT DOCUMENTS

| | | |
|---|---|---|
| JP | 2008-134986 A | 6/2008 |
| JP | 2014-089747 A | 5/2014 |
| JP | 2014-516442 A | 7/2014 |

*Primary Examiner* — Kalpit Parikh
(74) *Attorney, Agent, or Firm* — Procopio, Cory, Hargreaves & Savitch LLP

(57) ABSTRACT

Saving a capacity of an on-premises storage apparatus, a high access performance of the on-premises storage apparatus, and resuming an operation quickly and accurately by using data on a cloud when a resource in the on-premises fails are achieved.

A processor provides a first volume which is a virtual volume, and configures a copy pair of the first volume and a second volume provided from another storage system. Write data to the first volume is transferred to the second volume via a network, based on the copy pair. The processor writes to the memory a part of data written to the second volume, and writes to the storage device the data written to the memory.

21 Claims, 21 Drawing Sheets

Related U.S. Application Data continuation of application No. 15/511,186, filed as application No. PCT/JP2015/076089 on Sep. 15, 2015, now Pat. No. 10,353,592.

(51) Int. Cl.
*G06F 11/20* (2006.01)
*G06F 12/00* (2006.01)

(56) References Cited

U.S. PATENT DOCUMENTS

| | | |
|---|---|---|
| 9,274,956 B1 | 3/2016 | Salyers et al. |
| 2004/0117441 A1 | 6/2004 | Liu et al. |
| 2004/0267829 A1 | 12/2004 | Hirakawa et al. |
| 2006/0010341 A1* | 1/2006 | Kodama ............ G06F 11/0787 714/6.31 |
| 2008/0104346 A1 | 5/2008 | Watanabe et al. |
| 2009/0172333 A1 | 7/2009 | Marcu et al. |
| 2010/0103549 A1* | 4/2010 | Murayama ............ G06F 3/0686 |
| 2010/0199042 A1 | 8/2010 | Bates et al. |
| 2011/0178988 A1* | 7/2011 | Satoyama ............... G06F 3/067 707/649 |
| 2012/0151250 A1 | 6/2012 | Saika |
| 2013/0036280 A1 | 2/2013 | Futawatari et al. |
| 2013/0097377 A1* | 4/2013 | Satoyama ............ G06F 3/0647 711/E12.016 |
| 2014/0245026 A1* | 8/2014 | Bates .................... G06F 3/065 713/190 |
| 2014/0359420 A1 | 12/2014 | Zhu |

\* cited by examiner

FIG.6

Virtual volume table  225

| Virtual volume number (225a) | Address (225b) | Page allocation status (225c) | Page number (225d) | Read frequency (times/hr) (225e) | Write Frequency (times/hr) (225f) |
|---|---|---|---|---|---|
| 1 | 0-99 | Allocated | 2 | 100 | 20 |
| 1 | 100-199 | Allocated | Cloud | 1 | 1 |
| 1 | 200-299 | Allocated | Cloud | 0 | 0 |
| 1 | 300-399 | Not allocated | - | - | - |

FIG.7

| Volume number ~226a | Volume address ~226b | Cache address ~226c | Dirty ~226d | Resident bit ~226e | Largest SEQ ID ~226f |
|---|---|---|---|---|---|
| 1 | 0-512 | 0-512 | ON | OFF | - |
| 1 | 512-1024 | 1024-1536 | OFF | ON | 10 |
| ... | ... | ... | ... | ... | ... |
| 2 | 0-512 | 512-1024 | OFF | ON | 9999 |

~226

STORAGE SYSTEM, COMPUTER SYSTEM, AND CONTROL METHOD FOR STORAGE SYSTEM

CROSS-REFERENCE TO RELATED APPLICATIONS

This application is a Continuation of U.S. application Ser. No. 16/433,780, filed on Jun. 6, 2019, which is Continuation of U.S. application Ser. No. 15/511,186, filed on Mar. 14, 2017, now U.S. Pat. No. 10,353,592, which is a U.S. National Stage entry of PCT Application No. PCT/JP2015/076089, filed on Sep. 15, 2015. The contents of the foregoing are incorporated by reference.

TECHNICAL FIELD

The present invention relates to a storage system.

BACKGROUND ART

A computer system that processes a large amount of data manages data by using a large capacity storage system (for example, a cloud storage) provided separately from a host computer. One of use cases of the cloud storage is a case where a storage disposed in a data center (hereinafter, referred to as on-premises) of a client controls storage of data in the cloud storage. In this case, the host computer is unaware of the cloud storage.

Furthermore, an operation may be executed by a computer and a virtual machine on a cloud, by using data stored in the cloud. Thus, an operation using a large amount of resources at a time, such as data analysis processing, can be implemented at a low cost.

PTL 1 discloses a technique of storing a copy of data, stored in a storage in the on-premises, in the cloud. Differential data between the on-premises and the cloud is periodically stored in the cloud. In the technique, compression, encryption, and the like are performed, on the on-premises side, on data to be stored in the cloud, and a data structure is recognizable by the storage in the on-premises. Furthermore, data can be stored in a plurality of clouds.

A device virtualization function (external storage connection function) has been known in which a storage device is virtualized in a storage. The device virtualization function is a function of mapping a storage device in an external storage in an upper level storage, and providing as data in the upper level storage to the host.

CITATION LIST

Patent Literature

PTL 1

US Patent Application Publication No. 2014/0245026 (Specification)

SUMMARY OF INVENTION

Technical Problem

In the technique in PTL 1, the copy of the data stored in the storage in the on-premises is stored in the cloud as a backup. Thus, cost cannot be reduced by reducing the amount of data in the storage in the on-premises.

The technique in PTL 1 is not designed for executing an operation in the cloud side by using the data in the cloud. For example, a data structure cannot be recognized from the virtual machine in the cloud. Thus, the operation cannot be taken over by the virtual machine in the cloud.

Only the differential data is periodically transferred from the storage in the on-premises to the cloud. Thus, data not transferred to the cloud storage side might be lost when a failure occurs in the on-premises.

The device virtualization function described above may be used to map the storage in the cloud in the on-premises storage, as an external storage, whereby a capacity of the on-premises is reduced. However, the cloud is accessed for processing the I/Os issued from the host computer, and thus the performance is extremely low.

Solution to Problem

A storage system according to an aspect of the present invention for solving the problem described above is a storage system coupled to another storage system via a network, includes: a memory; a processor configured to execute a program stored in the memory; and a storage device. The processor is configured to provide a first volume, which is a virtual volume, by executing the program. The processor is configured to configure a copy pair of the first volume and a second volume provided from the other storage system. Write data to the first volume is transferred to the second volume via the network, based on the copy pair. The processor is configured to write a part of data transferred to the second volume to the memory, and to write the data written to the memory to the storage device.

Advantageous Effects of Invention

A capacity of an on-premises storage apparatus can be reduced, a high access performance of the on-premises storage apparatus can be achieved, and an operation can be resumed quickly and accurately by using data on a cloud when a failure occurs in the on-premises.

BRIEF DESCRIPTION OF DRAWINGS

FIG. 6 is a diagram illustrating an example of a virtual volume table 225.

FIG. 7 is a diagram illustrating an example of a cache management table 226.

DESCRIPTION OF EMBODIMENTS

Figure 1:
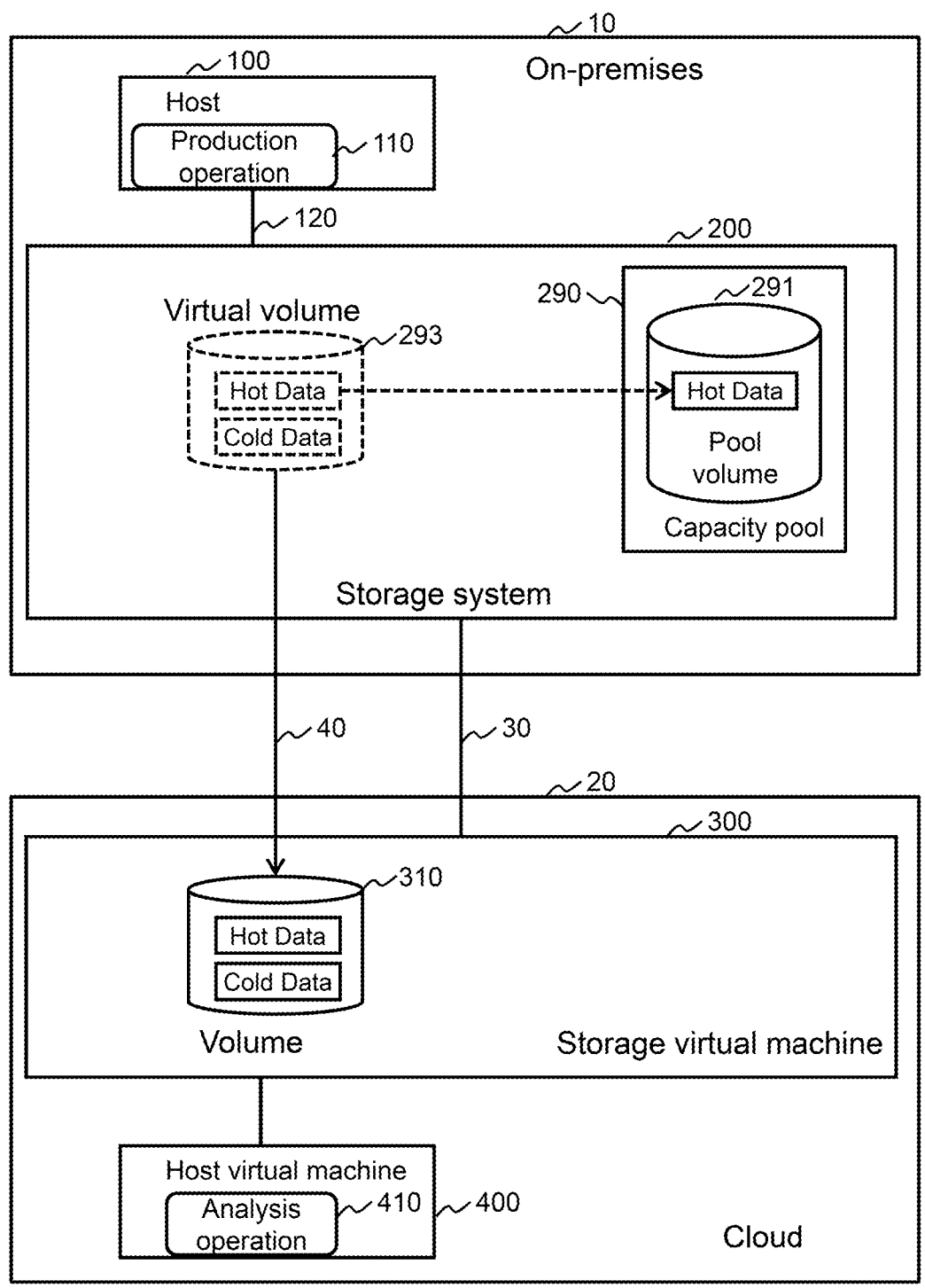
FIG. 1 is a diagram illustrating a configuration of a computer system according to Embodiment 1.

Embodiments of the present invention are described below with reference to the drawings.

In the following description, the term "xxx table" is used for describing information, which can be represented by any data structure. In other words, a "xxx table" can be referred to as "xxx information" to show independence of the information from data structures. In the following description, the configuration of each table is exemplary. One table can be divided into two or more tables, and two or more tables can be integrated into one table.

In the following description, IDs are used as information for identifying elements. Alternatively or additionally, other types of identification information may be used.

In the following description, reference numerals or common numbers in reference numerals may be used for describing the same type of elements without distinguishing them from one another, whereas such reference numerals or IDs assigned to such elements, instead of reference numerals, are used for describing them in a distinguishable manner.

In the following description, an I/O (input/output) request is a write request or a read request, and may be referred to as an access request.

In the following description, a "program" may be described as a subject for executing processing, but a processor may be a subject for executing processing since such a program, when executed by a processor (for example, CPU (central processing unit)), carries out a predetermined set of processing using a storage resource (for example, memory) and/or an interface device (for example, communication port) or the like as appropriate. The processing described herein as being executed by a program may be processing or a system executed by a processor or an apparatus including the processor. The processor may include a hardware circuit for executing part or all of the processing. The program may be installed in such an apparatus as a computer from a program source. The program source is, for example, may be a program distribution server or a computer-readable storage medium. When the program source is a program distribution server, the program distribution server includes a processor (for example, CPU) and a storage resource, and the storage resource may further store distribution programs and programs serving as distribution targets. When the processor in the program distribution server executes a distribution program, the processor in the program distribution server may distribute programs serving as distribution targets to other computers. In the following description, two or more programs may be implemented as one program, and one program may be implemented as two or more programs.

In the following description, a management system may include one or more computers. Specifically, for example, when the management computer displays information (specifically, for example, when the management computer displays the information on its display device or transmits the display information to a remote display computer), the management computer servers as a management system. For example, when a function equivalent to that of the management computer is implemented by a plurality of computers, the plurality of computers (that may include the display computer when the display computer is in charge of the displaying) serve as the management system. The management computer (for example, management system) may include: an interface device coupled to an I/O system including a display system; a storage resource (for example, a memory), and a processor coupled to the interface device and the storage resource. The display system may be the display device of the management computer or may be the display computer coupled to the management computer. The I/O system may be an I/O device (for example, a keyboard, a pointing device, and a touch panel) of the management computer, the display computer coupled to the management computer, or other computers. When "the display information is displayed" by the management computer, the display information is displayed on the display system. This could mean that the display information is displayed on the display device of the management computer, or that the display information is transmitted from the management computer to the display computer (in the latter case, the display information is displayed by the display computer). An input/output of information by the management computer may be an input/output of information to/from an I/O device of the management computer, or may be input/output of information from/to a remote computer (for example, the display computer) coupled to the management computer. The output of information may be displaying of information.

Embodiment 1

A configuration of a computer system according to Embodiment 1 is described below.

FIG. 1 illustrates a configuration of the computer system according to Embodiment 1.

The computer system according to the present embodiment includes an on-premises 10 and a cloud 20 coupled to each other via a network 30.

The on-premises 10 include a storage system 200 and a host 100 that stores data in the storage system. The host 100 executes a production operation 110. The storage system 200 stores data used in the operation. The host 100 and the storage system 200 are coupled to each other via a network 120. The storage system 200 may be referred to as a storage apparatus.

The cloud 20 executes a virtual machine 300 (hereinafter, referred to as a storage virtual machine or a storage VM) for providing a storage; and a host virtual machine 400 (hereinafter, referred to as a host VM) for accessing the storage. The host VM 400 performs an operation different from that performed by the host 100, and takes over the operation performed by the host 100 after a disaster occurs. An example of the operation performed by the host VM 400 includes an analysis operation 410 for data stored in the cloud 20 by the storage VM 300. The storage VM 300 may be a physical storage apparatus or computer, or may be a container providing a storage function. The host VM 400 may be a physical computer or a container. The storage VM 300 may execute the analysis operation 410 or the like. Thus, the storage VM 300 and the host VM 400 may be the same VM.

The storage system 200 uses a physical storage device to create a virtual volume 293 and a capacity pool 290. The capacity pool 290 is associated with a physical storage device such as an HDD (hard disk drive) in the storage system 200, and has a physical capacity. The virtual volume 293 is a virtual storage area, and is a storage area that is provided in the same manner as a normal volume to the host 100. The host 100 can handle the virtual volume 293 in the same manner as a normal volume. Upon receiving a write request for the virtual volume 293 from the host 100, the storage system 200 reserves an area in the capacity pool 290 and associates the area with an address designated by the write request. The write data itself is stored in the capacity pool 290. In the present embodiment, storing data in the virtual volume 293 includes: storing data in a cache in the storage system 200 as data on the virtual volume 293; and storing the data in the capacity pool 290 corresponding to the virtual volume 293. The physical storage device may be referred to as a storage device.

The data stored in the virtual volume 293 according to the present embodiment is classified into at least: Hot Data with a high access frequency; and Cold Data with an access frequency lower than that of the Hot Data. The data is classified in this manner based on its access frequency. The Hot Data and the Cold Data are provided to the host 100 via the virtual volume 293, and only the Hot Data is physically stored in the capacity pool 290 of the storage system 200. In the example illustrated in the figure, the Cold Data is stored in a storage in the cloud 20. Thus, the storage area in the cloud is provided as an on-premise storage area to the host computer, with the volume 310 in the cloud mapped on the virtual volume 293. It is a matter of course that the host 100 can access the Cold Data with an access request to the virtual volume 293. The storage system 200 that has received the access request to the Cold Data accesses the Cold Data in the cloud 20 via the network 30, and transfers the Cold Data to the host 100.

The storage system 200 is coupled to the storage VM 300 of the cloud 20 via the network 30. The Cold Data is stored in the storage VM 300.

Next, the storage VM 300 of the cloud 20 is described. The storage VM 300 is a VM or a hypervisor in the cloud 20, and has a program for executing storage processing installed therein.

The storage VM 300 creates a volume 310 by using a physical storage device in the cloud 20. The virtual volume 293 and the volume 310 are associated to each other by the storage VM 300 to be in a pair relationship 40 (copy pair). The storage system 200 and the storage VM 300 both manage the pair relationship. The volume 310 stores both the Hot Data and the Cold Data. The Hot Data in the volume 310 is a copy of the Hot Data in the virtual volume 293. The Cold Data in the volume 310 corresponds to the Cold Data in the virtual volume 293.

In the example illustrated in the figure, the storage VM 300 creates a normal, not virtual, volume 310. The volume 310 in the storage VM 300 may be a virtual volume. Thus, the storage VM 300 may include a capacity pool and the capacity pool may store both the Hot Data and the Cold Data, as in the case of the storage system 200. In this case, the virtual volume of the storage VM 300 corresponds to the Hot Data and the Cold Data.

In the computer system as a whole, the Hot Data is stored in both the storage system 200 and the storage VM 300, and the Cold Data is stored in the storage VM 300 only.

The Cold Data is data with a low access frequency. In this configuration, cost reduction can be achieved while maintaining the performance of the production operation 110, by storing the Cold Data in the cloud 20. When the cloud 20 stores both Hot Data and Cold Data, a different operation can be quickly executed in the cloud 20, and an operation can be taken over at the time of the disaster.

Figure 2:
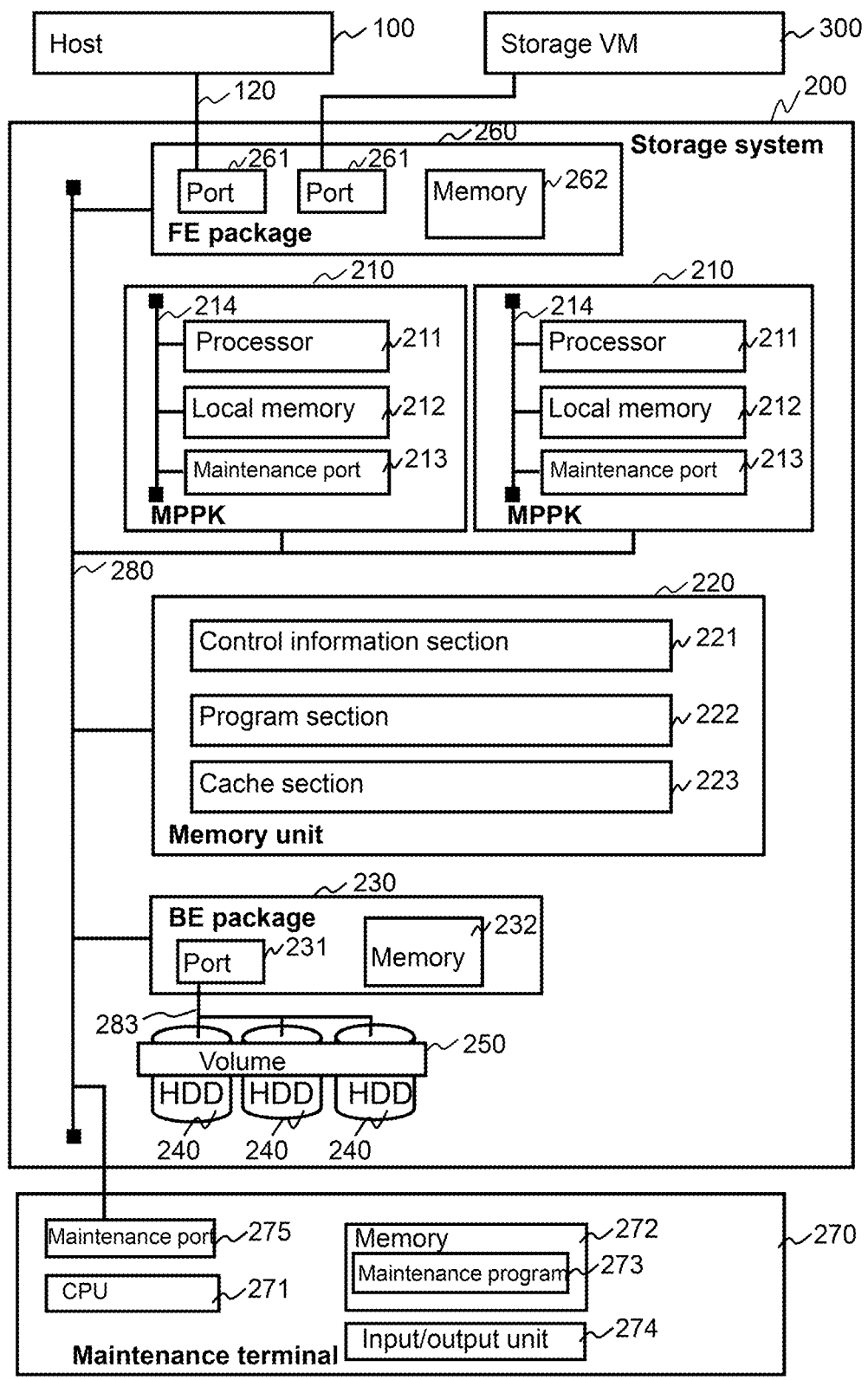
FIG. 2 is a diagram illustrating a configuration of a storage system 200.

FIG. 2 illustrates a configuration of the storage system 200.

The storage system 200 includes one or more microprocessor packages (MPPK) 210; a memory unit 220, a backend package (BE package) 230, and a frontend package (FE package) 260. The MPPK 210, the memory unit 220, the BE package 230, and the FE package 260 are coupled to each other via an internal bus 280, and may be referred to as a controller. The memory unit 220 may be referred to as a memory.

The FE package 260 includes ports 261 and a memory 262. The port 261 is coupled to the host 100 via the network 120. Communications with the host 100 are performed via the port 261. The port 261 is further coupled to the storage VM 300 via the network 30. Communications with the storage VM 300 are performed via the port 261. In the present embodiment, the host 100 and the storage VM 300 are coupled to the different ports 261, but may be coupled to the same port 261 by using a switch or the like. The memory 262 stores various types of data required for processing of the FE package 260. For example, the memory 262 is used to temporarily store data transferred from the host 100 or data to be transferred to the host 100. Similarly, the memory 262 may be used for storing data to be transferred to the storage VM 300 and the data transferred from the storage VM 300.

For example, the memory unit 220 is formed of one or more memory devices, and includes a control information section 221 that stores control information, a program section 222 that stores a program, and a cache section 223 as an example of a cache memory for caching data. The cache section 223 generally has a smaller capacity than the volume 250. The cache section 223 may also be referred to as a cache or a cache memory.

The MPPK 210 includes a processor 211, a local memory 212, and a maintenance port 213. The processor 211, the local memory 212, and the maintenance port 213 are coupled to each other via an internal bus 214. The local memory 212 stores various types of data required by the MPPK 210. Communications with the maintenance terminal 270 are performed via the maintenance port 213. The processor 211 executes various types of processing. More specifically, the processor 211 executes various types of processing by executing programs stored in the program section 222. The processor 211 executes various types of processing by using various types of information stored in the control information section 221 of the memory unit 220.

The BE package 230 includes a port 231 and a memory 232. The port 231 is coupled to an HDD, as one example of one or more physical storage devices 240, via a bus 283. For example, a storage area in one or more physical storage devices 240 is allocated to the volume 250 that manages data. The physical storage device is not limited to the HDD, and may be, for example, an SSD (solid state drive), DVD, SCM (storage class memory), or the like. A reliability enhancing technique such as RAID (redundant arrays of independent disks) may be used with one or more physical storage devices 240 grouped into a unit known as a parity group.

For example, a maintenance terminal 270, for maintenance on the storage system 200, is coupled to the storage system 200 via the bus 280. The maintenance terminal 270 includes a CPU 271, a memory 272, an input/output unit 274, and a maintenance port 275. The memory 272 stores a program (maintenance program) 273 for the maintenance. The CPU 271 executes the maintenance program 273 to execute the maintenance processing. For example, the input/output unit 274, including a mouse, keyboard, a display, and the like, receives various instruction inputs from an operator in charge of the maintenance, and causes a display to display various types of information. Communications with the storage system 200 are performed via the maintenance port 275. The computer system may include a management server coupled to the storage system via a network, instead of the maintenance terminal 270.

The storage system 200 according to the present embodiment may be implemented by a general server or the like installing therein a program for executing the storage processing. The storage processing is for controlling a read request, a write request, the RAID described above, and the like.

The configuration of the storage VM 300 is described. The cloud 20 includes at least one computer. A system similar to the storage system 200 may be used instead of the computer. The computer includes a processor, a memory coupled to the processor, and a physical storage device coupled to the processor. The processor executes the storage VM 300 and the host VM 400. The storage VM 300 has a configuration similar to that of the storage system 200. Generally, a VM provided by a cloud vender includes a processor resource, a memory resource, and a communication port. The storage VM 300, with a function that may be provided as a service, may be associated with the host VM 400 to be used as a storage device for the host VM 400. Thus, the backend package and the HDD are replaced with the storage device. Various VM resources, such as the storage VM 300 and the host VM 400, may be virtually provided.

Figure 3:
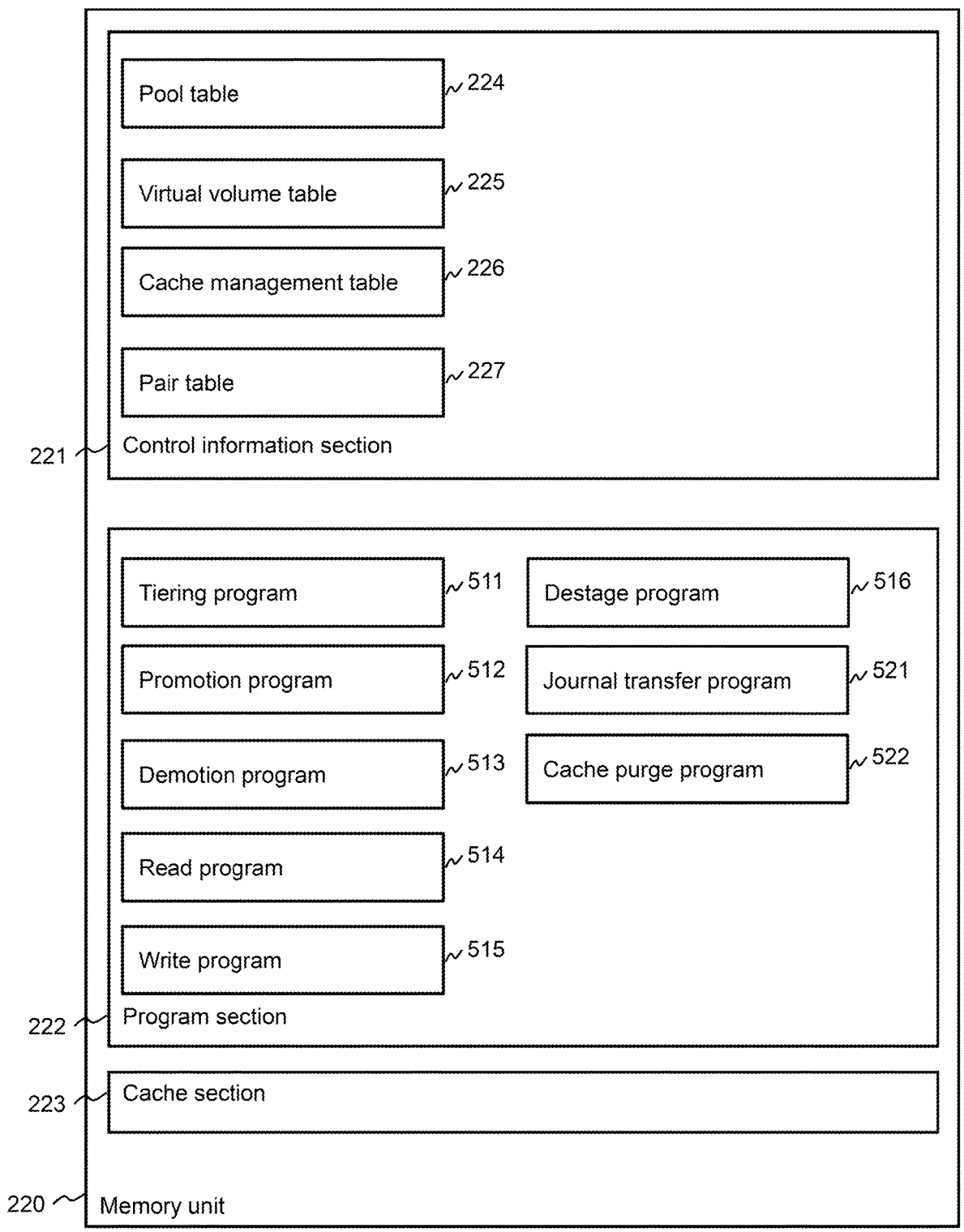
FIG. 3 is a diagram illustrating an example of a detail of a memory unit 220.

FIG. 3 illustrates an example of a detail of the memory unit 220.

The control information section 221 of the memory unit 220 stores a pool table 224, a virtual volume table 225, a cache management table 226, and a pair table 227. The detail of the pair table 227 is similar to that of a table managing a pair in a known remote copy system, and a description thereof is omitted.

The program section 222 of the memory unit 220 stores a tiering program 511, a promotion program 512, a demotion program 513, a read program 514, a write program 515, a destage program 516, a journal transfer program 521, and a cache purge program 522. The journal transfer program 521 and the cache purge program 522 may not be stored in the program section 222 according to Embodiment 1.

Figure 4:
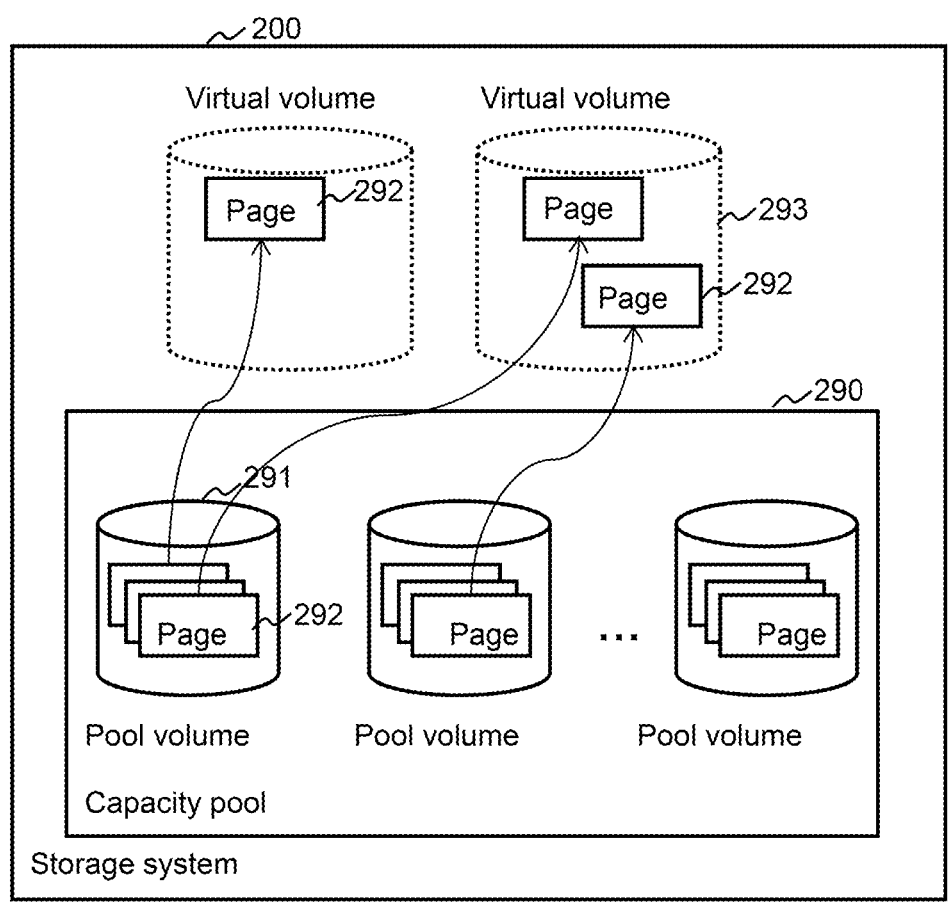
FIG. 4 is a diagram illustrating a relationship among a virtual volume 293, a capacity pool 290, and a pool volume 291.

FIG. 4 is a diagram illustrating a relationship among the virtual volume 293, the capacity pool 290, and the pool volume 291.

The storage system 200 creates the pool volume 291 from physical storage areas of a plurality of physical storage devices 240. The capacity pool 290 includes one or more pool volumes 291. The pool volume 291 includes a page 292, which is a physical storage area serving as a unit of allocation to the virtual volume 293. For example, the capacity of the page 292 can be several KB (Kilo Bytes) to dozens of MB (Mega Bytes).

When data is written to a virtual storage area in the virtual volume 293, the storage system 200 allocates the page 292, in the pool volume 291, to the virtual storage area. Thus, no page 292 is allocated to an area unused in the virtual volume 293, and thus no physical storage area of the physical storage device 240 is consumed for such an area.

Figure 5:
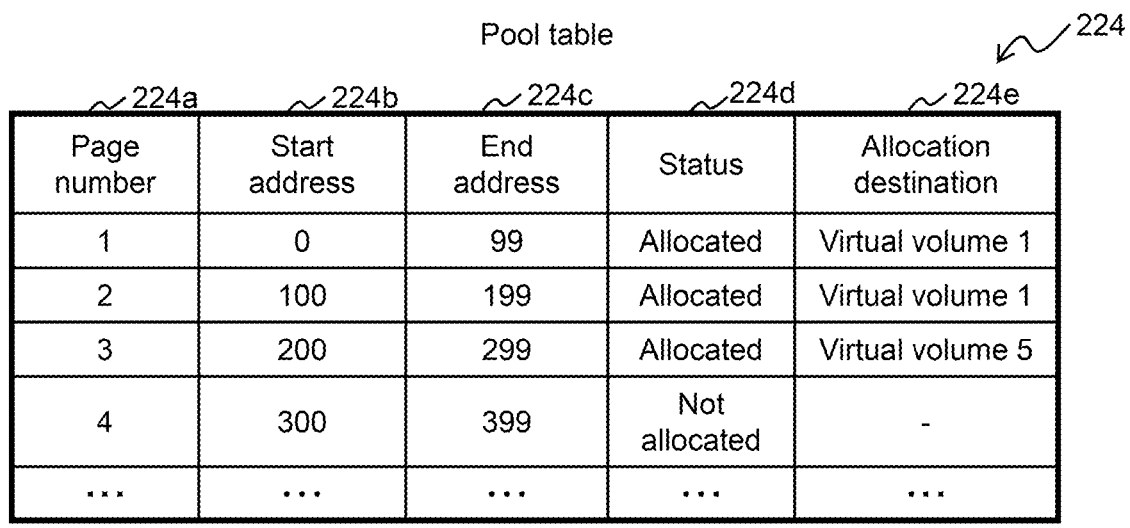
FIG. 5 is a diagram illustrating an example of a pool table 224.

FIG. 5 illustrates an example of the pool table 224.

The pool table 224 is a table managing the pages 292 in the capacity pool 290, and is stored in the control information section 221 of the memory unit 220.

The pool table 224 manages a record (entry) in which fields, such as a page number 224a, a start address 224b, an end address 224c, a status 224d, and an allocation destination 224e, are associated with each other. The page number 224a stores a page number for identifying the page 292 in the capacity pool 290. The start address 224b and the end address 224c are used for identifying the area of the page 292. These addresses are used for managing the entire capacity pool 290. It is a matter of course that the area of the page 292 may be managed with a pool volume number and a pool volume internal address. The end address 224c is not required if the page size is a fixed length.

The start address 224b stores start addresses of the corresponding pages 292. The end address 224c stores end addresses of the corresponding pages 292. The status 224d stores information indicating whether the corresponding page 292 is or is not allocated to the virtual volume 293. The allocation destination 224e stores the number of the virtual volume to which the corresponding page 292 is allocated. A record at the top of the pool table 224 indicates that a page with the page number "1", a start address "0", and an end address "99" is allocated to the virtual volume with the virtual volume number "1". A table for managing the number of an unallocated page or the other like table may be provided. In this case, an unallocated page can be quickly searched.

FIG. 6 illustrates an example of the virtual volume table 225.

The virtual volume table 225 is a table managing an allocation of the page 292 to the virtual volume 293, and is stored in the control information section 221 of the memory unit 220 for example.

The virtual volume table 225 manages a record with fields including a virtual volume number 225a, an address 225b, a page allocation status 225c, a page number 225d, a read frequency (times/hr) 225e, and a write frequency (times/hr) 225f. The address range in the virtual volume 293 is divided into virtual storage areas each having the same size as the page 292. A single record indicates a single virtual storage area. The virtual storage area may be referred to as a virtual page.

The virtual volume number 225a stores the virtual volume number for identifying the virtual volume 293. The address 225b stores an address range in the corresponding virtual volume 293. The page allocation status 225c stores information indicating whether a page has been allocated to the virtual storage area indicated by the corresponding address range. A page allocated to the virtual storage area may or may not correspond to the page 292 in the capacity pool 290. The page number 225d stores the page number of the page allocated to the virtual storage area, or an identifier indicating that the page allocated to the virtual storage area corresponds to none of the pages 292 in the capacity pool 290. When data stored in the virtual storage area is Hot Data, the data is physically stored in the capacity pool 290. When data stored in the virtual storage area is Cold Data, the data is not physically stored in the capacity pool 290, and is stored in the volume 310 of the cloud 20. In such a case, the page number 225*d* stores information indicating the cloud 20, "Cloud", for example, instead of the page 292 in the capacity pool 290.

The read frequency (times/hr) 225*e* stores the number of reads issued for the corresponding area per unit time. The write frequency (times/hr) 225*f* stores the number of writes issued for the corresponding area per unit time. The unit time, which is an hour in this example, may be a day, a minute, or a second. The storage system 200 measures an access frequency (a read frequency and a write frequency) of each virtual storage area, and updates the virtual volume table 225.

A record at the top of the virtual volume table 225 indicates that the page 292 with the page number "2" is allocated to the area of the addresses 0 to 99 of the virtual volume with "1" as the virtual volume number involving higher read frequency and write frequency than other addresses.

FIG. 7 illustrates an example of the cache management table 226.

The cache management table 226 manages a record having fields including a volume number 226*a*, a volume address 226*b*, a cache address 226*c*, a dirty 226*d*, a resident Bit 226*e*, and a largest SEQ ID 226*f*. The cache management table 226 according to the present embodiment may not include the resident Bit 226*e* and the largest SEQ ID 226*f*.

The volume number 226*a* is an identification number of a volume. The volume address 226*b* manages an address of the volume identified by the volume number. The cache address 226*c* manages an address of the cache section storing the cache data on the area designated by the volume address. The dirty 226*d* manages information indicating whether the cached data is a dirty cache or a clean cache. "ON" indicates dirty and "OFF" indicates clean. The resident Bit 226*e* and the largest SEQ ID 226*f* are described in Embodiment 2. The cache data that is written in the cache but is not written in the HDD is regarded as dirty. The dirty cache is created by the write request. The cache data that is same as data in the HDD is regarded as clean. The clean cache is created by the read request.

The storage system 200 creates a single record in the cache management table 226 when write data or read data for a non-cached area is stored in a cache. When the cache area is released, the corresponding record is deleted.

An operation of each program is descried below.

Figure 8:
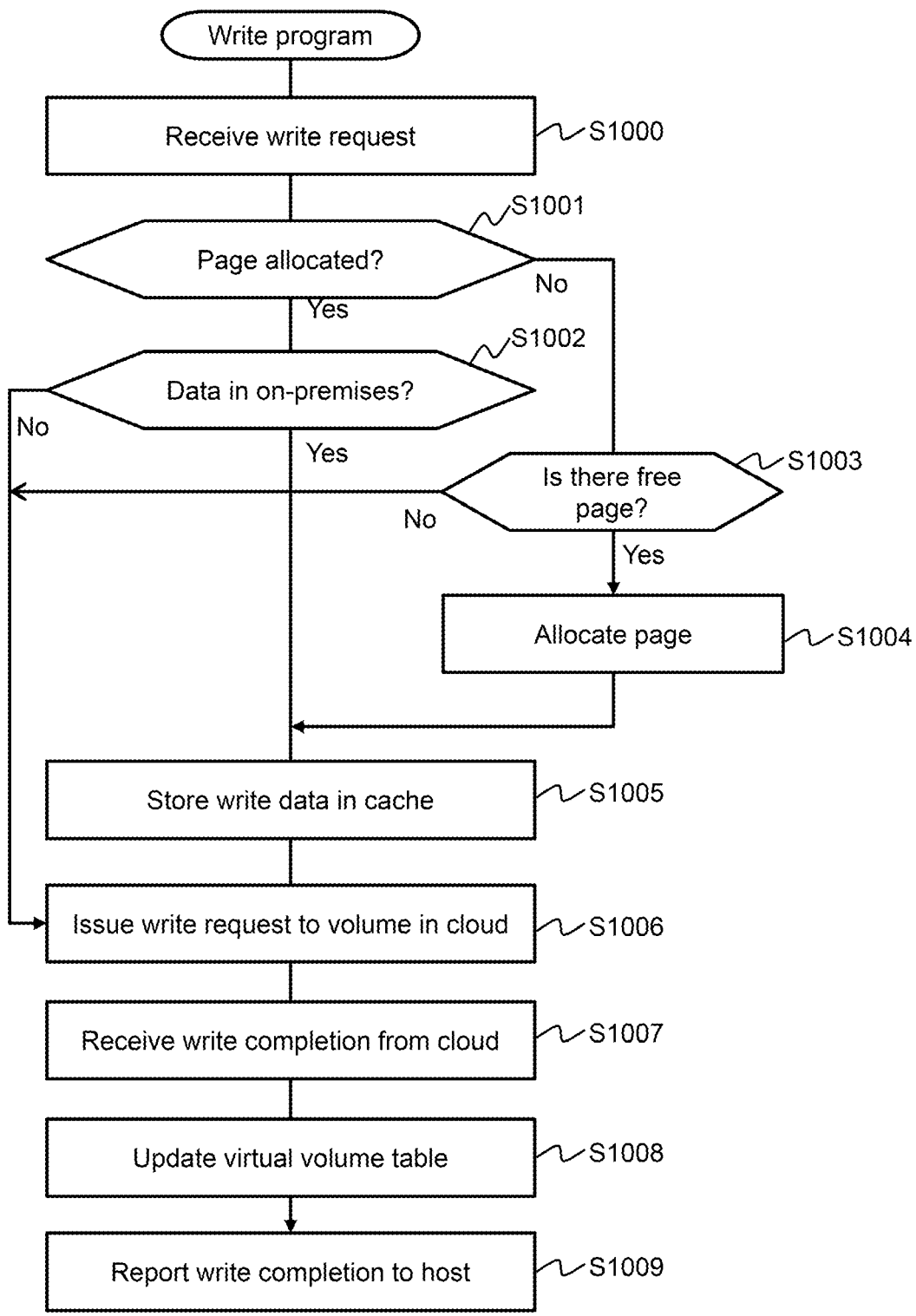
FIG. 8 is a flowchart illustrating an example of a write program according to Embodiment 1.

FIG. 8 is a flowchart illustrating an example of a write program according to Embodiment 1.

The write program 515 receives a write request to the virtual volume 293 from the host 100, and stores write data in a volume in the storage system 200.

First of all, the write program 515 receives a write request from the host 100 (S1000). The write request includes information such as write data, a write target volume number (virtual volume number in the present embodiment), a write address, and a write length.

Then, the write program 515 accesses the virtual volume table 225, and determines whether the page 292 is allocated to the write target address (S1001). The program 515 proceeds to S1002 when the page 292 is allocated to the write target address, and proceeds to S1003 when the page 292 is not allocated.

In S1002, the write program 515 checks the value of the page number in the virtual volume table 225 and determines whether the page 292 is stored in the storage system 200 of the on-premises 10 or in the storage VM 300 of the cloud 20 (S1002). When the page 292 is in the on-premises 10, the write program 515 proceeds to S1005 and stores the write data in the cache (S1005).

On the other hand, when the page is in the cloud, the write program 515 skips S1005, and issues a write request to the cloud 20 (S1006).

Upon proceeding to S1003 because the page 292 is not allocated, the write program 515 checks whether there is a free page in the capacity pool 290 (S1003). This is realized by checking the status of the pool table 224. When there is no free page, the write program 515 proceeds to S1006, and issues the write request to the cloud 20 (S1006). On the other hand, when there is the free page, the write program 515 allocates the page 292 to the area including the write target address (S1004), and stores the write data in the cache (S1005). The page allocation processing involves updating the status 224*d* and the allocation destination 224*e* in the pool table 224, and updating the page allocation status 225*c* and the page number 225*d* in the virtual volume table 225.

In S1006, the write program 515 issues a write request to the volume 310 of the cloud 20, and waits for a completion report from the cloud 20 (S1006). More specifically, the write program 515 accesses the pair table 227, which is stored in the control information section 221, and which manages the pair relationship between the virtual volume 293 and the volume 310, and acquires information on the volume 310 and information on the storage VM 300 storing the volume 310. The write program 515 transmits a write request to the storage VM 300. This write request includes the information on the storage VM 300 and the information on the volume 310 thus acquired, as well as the write address and the write data in the write request. For example, an address in the virtual volume 310 is associated with an address in the volume 310.

Next, the write program 515 receives the completion report for the write request from the cloud 20 (S1007), and updates the virtual volume table 225 when a result of the determination in S1001 is "No" (S1008). Specifically, when the result of the determination in S1003 is "No", the write program 515 updates the page allocation status 225*c* in the record corresponding to the write address to "allocated", and updates the page number 225*d* to "Cloud". When the result of the determination in S1003 is "Yes", the write program 515 updates the page allocation status 225*c* in a record corresponding to the write address to "allocated", and updates the page number 225*d* to the page number of the page allocated in S1004.

As a final step, the write program 515 issues a write completion report to the host 100, and terminates the processing (S1009).

The storage system 200 classifies the page into Hot Data or Cold Data in accordance with the access frequency of the page 292. Thus, the write program 515 and the read program 514 also update information for calculating an IO frequency. These are known as a storage tier control technique, and a processing step or the like thereof is omitted.

In S1005, the write program 515 may store the write data in the physical storage device 240, without storing the write data in the cache.

With the write program 515, when the write request is issued to the Hot Data, on-premises data is updated in step S1005 and data on the cloud is updated in step S1006. Thus, the write data is duplicated. On the other hand, when the write request is issued to the Cold Data, only the data in the cloud is updated in step S1006.

When a first storage area is allocated from the on-premises side physical storage device to the virtual storage area corresponding to the write area designated with the write request, the write data is written to the physical storage device in the on-premises 10. When a second storage area as a storage area in the cloud side is allocated to the write target area, the write data is transferred to the cloud without being written to the physical storage device in the on-premises 10. For example, the first storage area is a page associated with the capacity pool 290. For example, the second storage area is a page not associated with the capacity pool 290. Thus, the storage system 200 can store only the Hot Data in the on-premises 10.

When the first storage area or the second storage is not allocated to the write target area, the storage system 200 preferentially allocates the first storage area to the write target area. Thus, the storage system 200 can handle new data as Hot Data, when the page in the capacity pool 290 can be allocated to the write target area. As described above, in the example illustrated in FIG. 8, when an area to which no page has been allocated is updated, the page is processed as in the case of the Hot Data when there is a free page. A write request to an area to which no page has been allocated is expected to be the first I/O request issued to the write target area. Thus, the write request to the area to which no page has been allocated may be processed as in the case of the Cold Data. Specifically, this is achieved when the processing proceeds to step S1006 with the result of the determination instep S1003 being "Yes".

Figure 9:
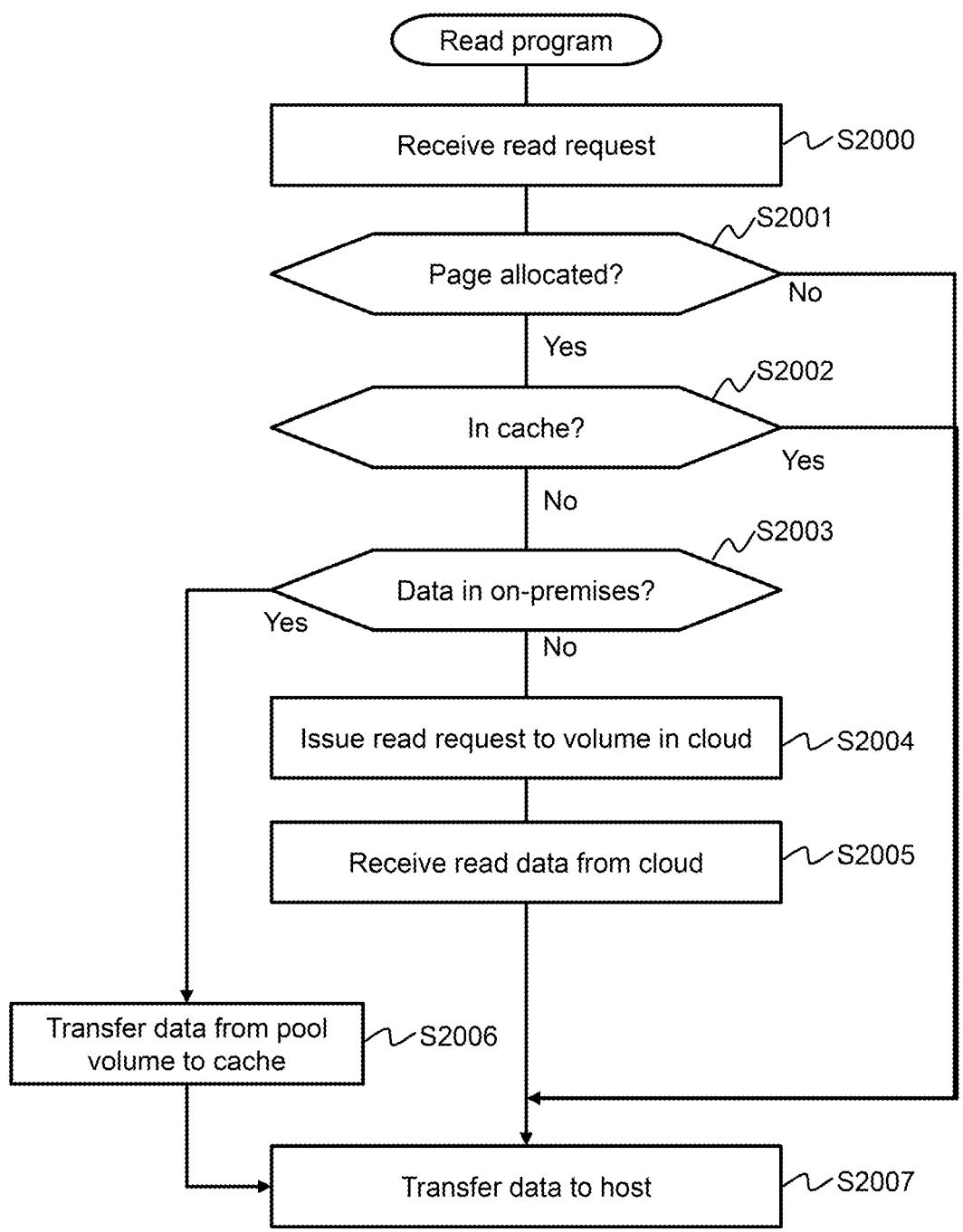
FIG. 9 is a flowchart illustrating an example of a read program according to Embodiment 1.

FIG. 9 is a flowchart illustrating an example of a read program according to Embodiment 1.

The read program 514 receives a read request to the virtual volume 293 from the host 100, and transmits read data as a response to the host 100.

First of all, the read program 514 receives a read request from the host 100 (S2000). The read request includes information such as a read target volume number (virtual volume number in the present embodiment), a read address, and a read length.

Next, the read program 514 accesses the virtual volume table 225, and determines whether the page 292 is allocated to the read target address (S2001). When no page 292 is allocated, the read target address is a no allocation area, and thus the read program 514 transfers zero data to the host 100 in S2007, and terminates the processing (S2007). The read program 514 may transmit an error to the host 100 as a response instead of the zero data.

When the page 292 is allocated, the read program 514 refers to the cache management table 226 and determines whether the read target data is in the cache (S2002). When the read target data is in the cache, the read program 514 transfers data from the cache to the host 100, and terminates the processing (S2007).

When the read target data is not in the cache, the read program 514 determines whether the page 292 corresponding to the read target address is stored in the storage system 200 of the on-premises 10 or in the storage VM 300 of the cloud 20 (S2003). When the page 292 is in the on-premises 10, the read program 514 accesses the pool volume 291, stores the read target data in the cache (S2006), and transfers the data from the cache to the host 100 (S2007). The data is physically stored in the physical storage device 240, and thus the data is transferred to the cache from the physical storage device 240 corresponding to the pool volume 291 in step S2006.

When the page 292 is in the cloud 20, the read program 514 issues a read request to the volume 310 of the cloud 20, and waits for the completion report from the cloud 20 (S2004). The read program 514 acquires information on the storage VM 300 and on the volume 310 as the destination of the read request from the pair table 227, as in the case of the write request.

Next, the read program 514 receives the read target data from the cloud 20 (S2005), and transfers the read data thus received to the host 100 as the final step (S2007). After the read target data has been received by the storage system 200 from the cloud 20 and before the read target data is transferred to the host 100, the read target data is temporarily stored in the memory 262 of the FE package 260, the cache, or the like.

With the read program 514, the storage system 200 reads the read data from the cache upon determining that the cache is associated with the read target area as the virtual storage area designated by the read request. Thus, the storage system 200 can quickly respond to the host 100. Upon determining that the cache is not associated with the read target data and that the page associated with the capacity pool 290 is allocated to the read target area, the storage system 200 reads the read data from the capacity pool 290. Upon determining that the cache is not associated with the read target area and that the page not associated with the capacity pool 290 allocated to the read target area, the storage system 200 reads the read data from the cloud 20. Thus, the storage system 200 can read the Hot Data, not in the cache, from the on-premises 10 and can read the Cold Data, not in the cache, from the cloud 20.

As described above, in the present invention, the all the pieces of data can be held in the cloud side, and data with a high access frequency can also be held on the on-premises side.

Duplication of data with conventional remote copying doubles the consumed storage area.

When the virtual volume is presented on the on-premises side and all the pieces of data is stored in the cloud side for reducing the amount of capacity consumed on the on-premises side, the performance might be degraded with the cloud accessed for processing all the I/Os issued from the host computer. The tier control based on the access frequency of data between on-premises storage apparatus and a cloud side storage may further be combined. However, in the resultant configuration, data with a high access frequency is not stored in the cloud side, the operation in the cloud side cannot be performed, and recovery from a failure cannot be achieved on the on-premises side. An I/O performance may be improved by caching data, stored in a storage on a cloud, in a cache area of an on-premises storage system. However, cache data needs to be written to the cloud when the operation is resumed in the cloud side due to the on-premises host computer failure. Thus, the operation cannot be swiftly resumed. Furthermore, the data might be partially lost when the on-premises storage system fails.

In this regard, in the present embodiment, Hot Data can be implemented only through an access of an on-premises storage system, whereby a high I/O performance can be achieved. Furthermore, write data is written in synchronization with the write request. Thus, when the on-premises fails, the operation can be swiftly resumed by using data in the cloud 20.

A modification of Embodiment 1 is described.

In the processing of the write program 515 and the read program 514 described above, when the Cold Data is written or read, no data is cached in the cache of the storage system 200. For example, when the data is in the cloud 20 in S1002, the write program 515 skips S1005, in which the data is stored in the cache, and proceeds to S1006 to issue a write request to the cloud 20. The read program 514 receives data from the cloud 20 in S2005 and transfers the data to the host 100. Thus, the data read from the cloud does not remain in the cache of the storage system 200 as the cache data.

Thus, a modification may be employed in which when the Cold Data is written or read, the storage system 200 may cache the data in the cache as the data on the virtual volume 293. This operation is described below.

When the result of the determination in S1002 is "No" or the result of the determination is "No" in S1003, the write program 515 proceeds to S1005, and not to S1006, to store the write data in the cache as the cache data on the virtual volume 293. Thus, cache hit (data is in the cache) is expected in S2002 executed by the read program 514.

The read program 514 executes processing of storing the data received in S2005 in the cache as the data on the virtual volume 293, immediately after S2005. Thus, the cache hit (data is in the cache) is expected in S2002 executed by the read program 514 for a read request issued thereafter.

The caching as the data on the virtual volume 293 can be implemented by management with the cache management table 226 in which the address (the address accessed for the writing or reading) on the virtual volume 293 and the address of the cache storing data are associated with each other.

In the modification, destage processing is required for caching the Cold Data in the cache section of the storage system 200. The destage processing is processing of writing data, written to the cache with the write data, to the physical storage device 240. The Cold Data is not associated with the pool volume 291, and thus has no physical storage device 240 to be a write destination. Such a situation does not occur with a conventional virtual volume. The destage program 516 which has a solution to this situation described below.

Figure 10:
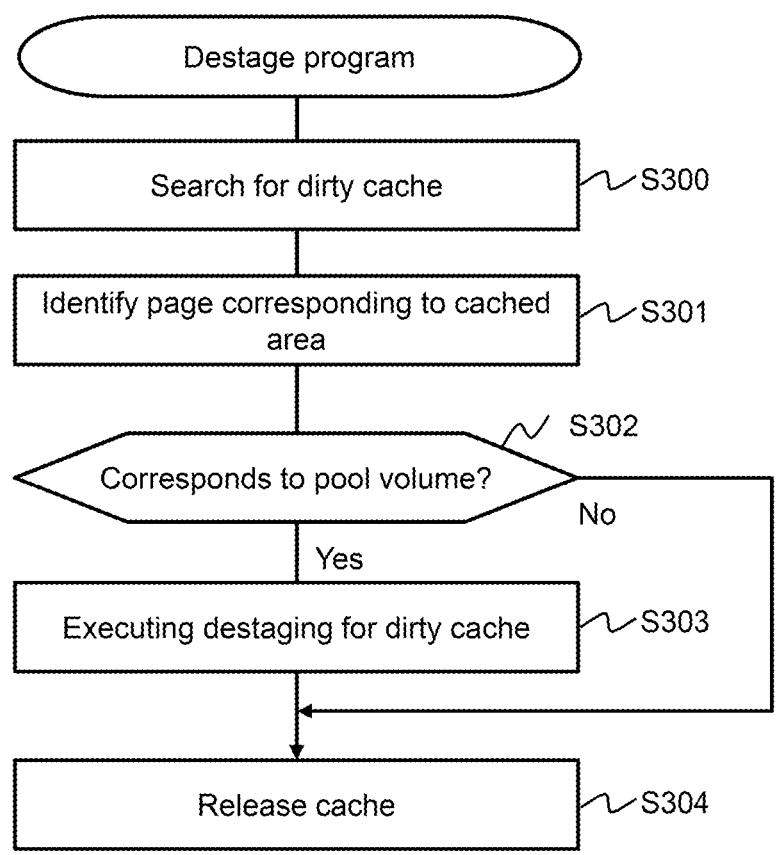
FIG. 10 is a flowchart illustrating an example of a destage program 516 according to Embodiment 1.

FIG. 10 is an example of a flowchart illustrating an example of the destage program 516 according to Embodiment 1.

This program is called from another program. For example, the destage program 516 may be called from a program monitoring an amount of dirty caches. When there is not enough cache as an allocation destination at the time of IO, the destage program 516 may also be called from a program that processes an IO.

First of all, the destage program 516 searches the cache data for a dirty cache (S300).

Next, the destage program 516 identifies the page 292 corresponding to the cached area (S301). Specifically, the destage program 516 acquires an address of the virtual volume 293 corresponding to the cache data. Such an address can be acquired by referring to the cache management table 226. Next, the destage program 516 refers to the virtual volume table 225 and identifies the page number corresponding to the address of the virtual volume 293 thus acquired.

Then, the destage program 516 determines whether the identified page corresponds to the pool volume 291 (S302). When the page corresponds to the pool volume 291, the physical storage device 240 corresponding to the cache data is in the storage system 200. Thus, the destage program 516 executes destaging (S303). More specifically, the destage program 516 writes the cache data to the physical storage device 240. As a final step, the destage program 516 releases the cache and terminates the processing (S304).

On the other hand, when the page does not correspond to the pool volume 291, the physical storage device 240 corresponding to the cache data is not in the storage system 200. Thus, the destage program 516 releases the cache and terminates the processing (S304). Specifically, the target Cold Data is stored in the volume 310 of the cloud 20, and thus the destage program 516 may simply release the cache.

When the result of the determination in S1002 is "No" or the result of the determination in S1003 is "No", the write program 515 may cache the data as a clean cache in S1005. The clean cache corresponds to the same data in the physical storage device 240, and thus is released without being written to the physical storage device 240. The target Cold Data is stored in the volume 310 of the cloud 20. Thus, the destage program 516 may simply release the cache. As the write program 515 handles the write data to the cloud 20 as a clean cache, no change is required from the existing destage program 516. Generally, a dirty cache is mirrored, but a clean cache needs not to be mirrored. Thus, the cache consumed amount can be reduced.

The storage system 200 may perform a management with the cache management table 226 for checking whether there is an HDD corresponding to the cache for S301 and S302.

With the destage program 516, the storage system 200 discards data, in data in the cache, not associated with the capacity pool 290. Thus, the storage system 200 can release a cache without writing Cold Data to the physical storage device 240.

The computer system according to the present embodiment uses IO frequency information to classify data into Hot Data or Cold Data, so that only the Hot Data is stored in the storage system 200 of the on-premises 10 and that the Hot Data and the Cold Data are stored in the storage VM 300 of the cloud 20. The change in the IO frequency involves change from Hot Data to Cold Data and change from Cold Data to Hot Data. The data storage location needs to be changed in accordance with these changes.

Figure 11:
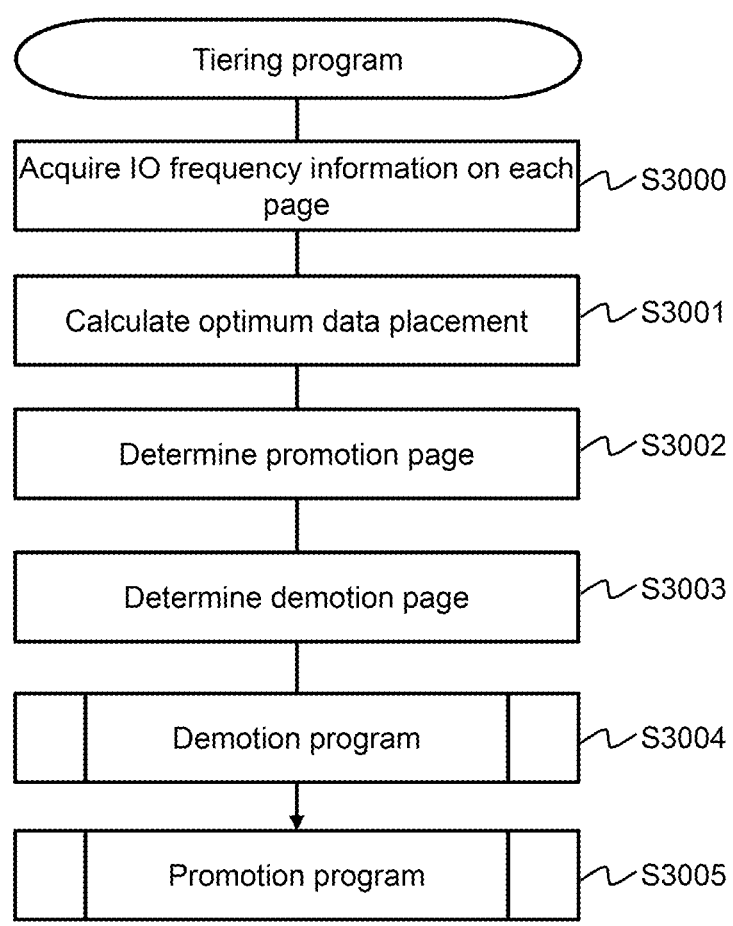
FIG. 11 is a flowchart illustrating an example of a tiering program according to Embodiment 1.

FIG. 11 is a flowchart illustrating an example of a tiering program according to Embodiment 1.

The tiering program 511 calculates an optimum data storage placement, based on the change in the IO frequency information, and boots the demotion program 513 and the promotion program 512 actually in charge of the change in the data placement. Demotion corresponds to the change in the data storage location in accordance with the change from the Hot Data to the Cold Data. Promotion corresponds to the change in the data storage location in accordance with the change from the Cold Data to the Hot Data. The tiering program 511 is periodically executed in the storage system 200. For example, when the data placement review frequency is once an hour, the tiering program 511 is started once an hour. The data placement review frequency may be set by a user or a storage administrator via the maintenance terminal 270, a management server, or the like.

First of all, the tiering program 511 acquires the IO frequency information on each area of the virtual volume from the virtual volume table 225 (S3000), and calculates the optimum data placement by using the IO frequency information (S3001). Then, the tiering program 511 compares the current placement with the optimum placement to determine data to be promoted and data to be demoted (S3002, S3003).

For example, the tiering program 511 determines the placement as follows. Specifically, the areas of the virtual volume are arranged in a descending order of the IO frequency. Then, the tiering program 511 obtains an IO frequency threshold for determining Hot Data and Cold Data, based on the capacity of the capacity pool 290 of the on-premises 10, and determines an area corresponding to data to be stored in the capacity pool of the on-premises 10 as Hot Data.

The tiering program 511 identifies data to be a promotion target except for data that is stored in the capacity pool 290. Similarly, the tiering program 511 determines data to be a demotion target from the data that has already been stored in the capacity pool 290 and can no longer be in the capacity pool 290.

Processing executed by the tiering program 511 at and after S3004 is described below. The tiering program 511 designates the demotion target and calls the demotion program 513 (S3004). As a final step, the tiering program 511 designates the promotion target, calls the promotion program 512, and terminates the processing (S3005). In many cases, the physical storage device of the storage system 200 has a smaller capacity than the physical storage device of the storage VM 300. The tiering program 511 generally executes the demotion program 513 first to create a free page in the capacity pool 290. When a plurality of pieces of data are promoted and demoted, the area for storing the Hot Data can be efficiently used with the demotion and the promotion alternately executed.

With the tiering program 511, the storage system 200 classifies each virtual storage area into any one of a first group and a second group, based on the access frequency of the virtual storage area. A page associated with the capacity pool 290 is allocated to the virtual storage area classified into the first group. A page not associated with the capacity pool 290 is allocated to the virtual storage area classified into the second group. For example, the first group is the virtual storage area corresponding to the Hot Data. For example, the second group is the virtual storage area corresponding to the Cold Data. Thus, the capacity of the physical storage device 240 of the on-premises 10 can be saved without compromising the performance of the on-premises 10.

Figure 12:
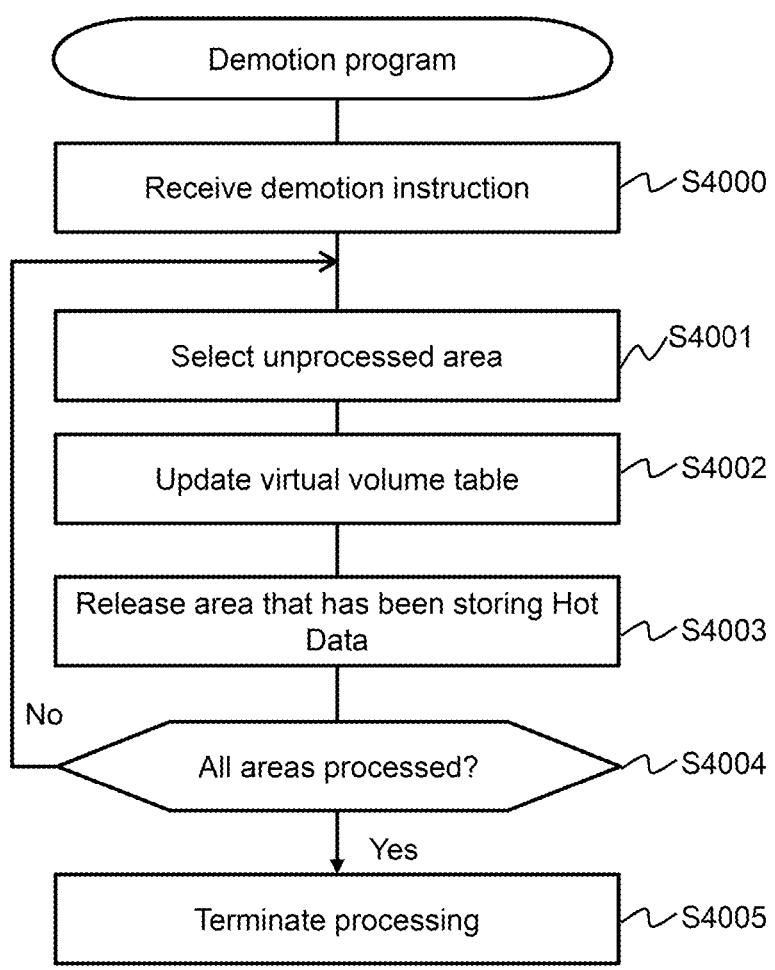
FIG. 12 is a flowchart illustrating an example of a demotion program according to Embodiment 1.

FIG. 12 is a flowchart illustrating an example of a demotion program according to Embodiment 1.

The demotion program 513 is called by the tiering program 511, and is executed by the storage system 200.

First of all, the demotion program 513 receives a demotion instruction (S4000). In this process, the demotion program 513 receives an area (an area identified by the virtual volume number and an address in the virtual volume) in one or more virtual volumes 293 as the demotion target, as a parameter.

In the present embodiment, the demotion program 513 receives a plurality of pieces of area information, and executes processing on the plurality of areas. Alternatively, the demotion program 513 may be a function of implementing the demotion for a single area, and the tiering program 511 may call the demotion program 513 for a plurality of times.

Next, the demotion program 513 selects one unprocessed area from the demotion targets (S4001), and updates the virtual volume table 225 for the virtual volume 293 using the area (S4002). Specifically, the demotion program 513 changes the page number to "Cloud". After the change, the demotion program 513 releases the area of the capacity pool 290 that has stored the Hot Data (S4003).

Next, the demotion program 513 checks whether all the instructed areas have been processed (S4004). When all the instructed areas have been processed, the demotion program 513 terminates the processing (S4005).

On the other hand, when there is still an unprocessed area remaining, the demotion program 513 returns to S4001, and executes S4002 and S4003 on the next unprocessed area.

With the demotion program 513, the storage system 200 executes the demotion of the virtual storage area by changing the page that is associated with the capacity pool 290 and is allocated to the demotion target area into a page not associated with the capacity pool 290. Thus, the storage system 200 can execute the demotion without reading data from the capacity pool 290 and writing the data to the cloud 20.

Figure 13:
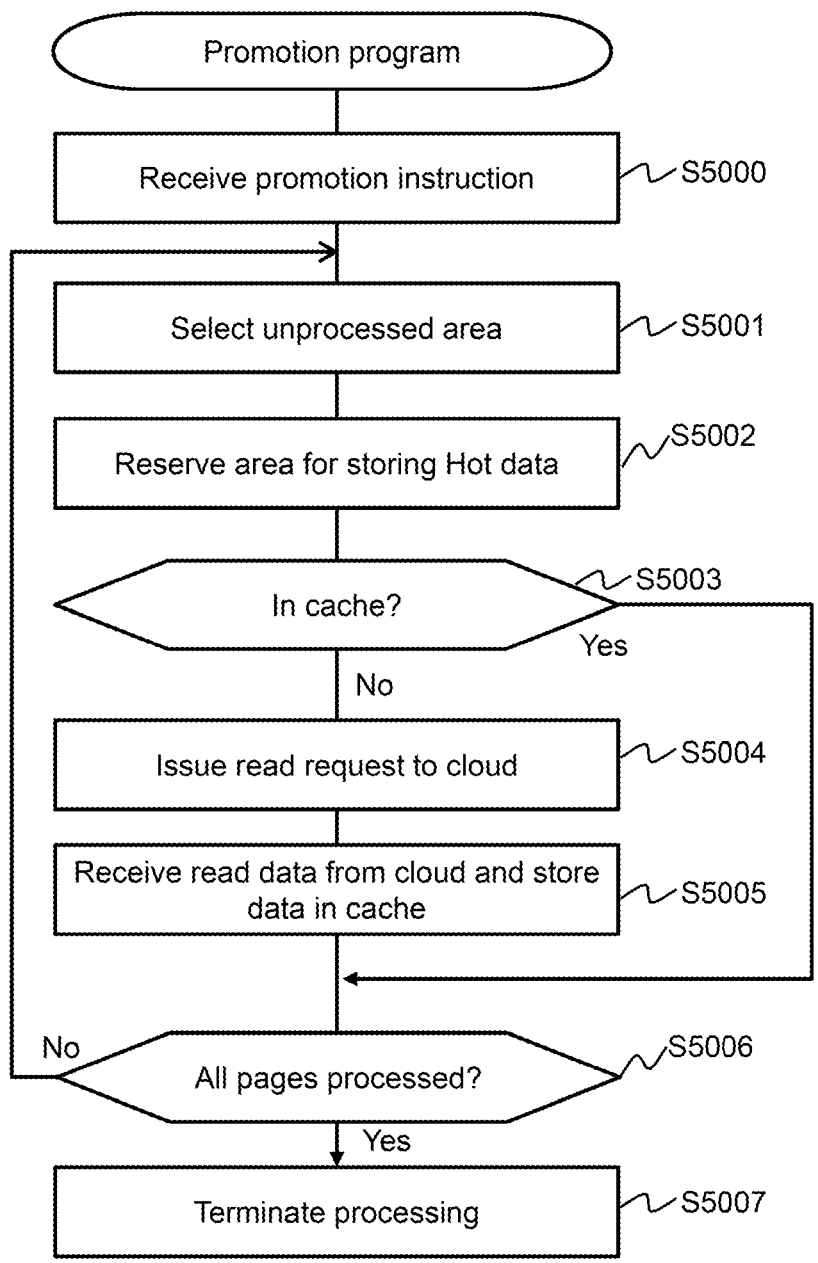
FIG. 13 is a flowchart illustrating an example of a promotion program according to Embodiment 1.

FIG. 13 is a flowchart illustrating an example of a promotion program according to Embodiment 1.

The promotion program 512 is called by the tiering program 511, and is executed by the storage system 200.

First of all, the promotion program 512 receives a promotion instruction (S5000). In this process, the promotion program 512 receives an area (an area identified with the virtual volume number and an address in the virtual volume) in one or more virtual volumes as the promotion target, as a parameter.

Next, the promotion program 512 selects one unprocessed area from the promotion target (S5001), and reserves an area for storing the area in the capacity pool 290 (S5002). More specifically, the promotion program 512 updates the status 224d and the allocation destination 224e in the pool table 224. The promotion program 512 further updates the page number 225d in the virtual volume table 225. With this processing, the result in S302 executed by the destage program 516 is changed.

Next, the promotion program 512 checks whether the data on the selected area is cached by referring to the cache management table 226 (S5003).

When the data is cached, the promotion program 512 skips S5004 and S5005, and proceeds to S5006.

On the other hand, when the data is not cached, the promotion program 512 issues the read request to the storage VM 300, and waits for a response from the storage VM 300 (S5004). Then, the promotion program 512 receives promotion target data from the storage VM 300 and stores the data as dirty (S5005).

Thus, a state where the promotion target data is stored in the cache is achieved. The page number of the pool volume 291 is stored in the page number 225d in the virtual volume table 225. This data is written to the physical storage device 240 in the storage system 200 by the destage program 516.

When the writing or the reading of the Cold Data by the storage system 200 involves no caching, S5003 needs not to be executed. Still, S5004 and S5005 need to be executed.

When the Cold Data read or written by the storage system 200 is cached as clean, the data is not written to the physical storage device 240 by the destage program 516. This can be prevented by two ways. First way is changing the attribute of the cache from clean to dirty when the result of the determination in step S5003 is "Yes". Second way is temporarily releasing the clean cache and executing step S5004 and step S5005 when the result of the determination in step S5003 is "Yes".

Next, the promotion program 512 checks whether all the instructed areas have been processed (S5006). When all the instructed are have been processed, the promotion program 512 terminates the processing (S5007).

When an unprocessed area is still remaining, the promotion program 512 returns to S5001, and executes S5002 to S5005 on the next unprocessed area.

In the storage system 200 according to the present embodiment, the processing is branched into that for the read request and that for the write request, based on the page allocation status 225c and the page number 225d. More specifically, the storage system 200 executes the processing with "page not allocated" determined as a not allocated state (state A), and with the "page allocated+effective page number (numerical value)" indicating a state (state B) in which the page has been allocated and the data is stored in the on-premises 10 and the cloud 20. Furthermore, the storage system 200 executes the processing with "page allocated+ineffective page number ("Cloud")" determined as a state (state C) in which the page has been allocated and the data is stored in the cloud 20 only.

An operation similar to that in the present embodiment can also be implemented with the page allocation status only.

The storage system 200 first executes processing with "page allocated" indicating that the page in the on-premises 10 has been allocated, and the data is stored in the on-premises 10 and in the cloud 20. Thus, the processing similar to that in the state B is executed.

Next, a method of returning a result similar to those in the states A and C with "page not allocated" will be described.

First of all, the read program issues a read request to the cloud 20. When no write has been written from the host 100 to the target area, the zero data is returned from the cloud 20 to the storage system 200. Thus, the same result as that in the unallocated case can be obtained. When the write has been written from the host 100 to the area, the read target data stored in the cloud 20 is returned to the storage system 200. That is correct read target data is returned.

Next, the write program issues a write request to the cloud 20, and stores the write data in the cloud 20. Thus, the IO processing can be implemented without problems. When the on-premises 10 includes a free page, the write program may allocate the page to the target area. In such a case, the write program writes the write data to both the allocated page and the cloud 20.

All things considered, the situation where no physical storage area of the on-premises 10 and the cloud 20 has been allocated to the target area might require communications with the cloud 20, but still can return a correct IO result.

In the above described method with the read program 514 and the write program 515, the virtual volume 293 of the on-premises 10 receives an I/O request.

A High Availability (HA) function that has the following configuration has been known. Specifically, data on two volumes in different storages are mirrored between the volumes and virtual IDs unique to the storages are allocated to the two volumes, so that the volumes appear as a single volume to the host 100. With this function, the host 100 can issue an IO request to both storages.

The storage system 200 and the storage VM 300 according to the present embodiment may act as in this function, so that the virtual volume 293 and the volume 310 can be provided as a single volume to the host. The host 100 can issue the IO request to both the storage system 200 of the on-premises 10 and the storage VM 300 of the cloud 20. For example, when the host 100 is a virtual machine, and is migrated to the cloud 20 as the host VM 400, the IO to the volume 310 of the storage VM 300 can be continuously performed. When the storage VM 300 and the storage system 200 are disposed close to each other, the host 100 may issue an IO request to both volumes. In this case, a path from the host 100 to the storage VM 300 is assumed to be set. An improvement of path performance and improvement of reliability against path failure can be expected when the host 100 uses a plurality of paths.

Embodiment 2

Generally, the cloud 20 has a poor access latency (high latency). When Hot Data with a high access frequency is accessed, an access to the cloud 20 synchronized with IO is preferably prevented. To prevent the access to the cloud 20 synchronized with the IO, a write request is asynchronously issued to the cloud 20. A technique for asynchronously transferring write includes asynchronous remote copy.

Figure 14:
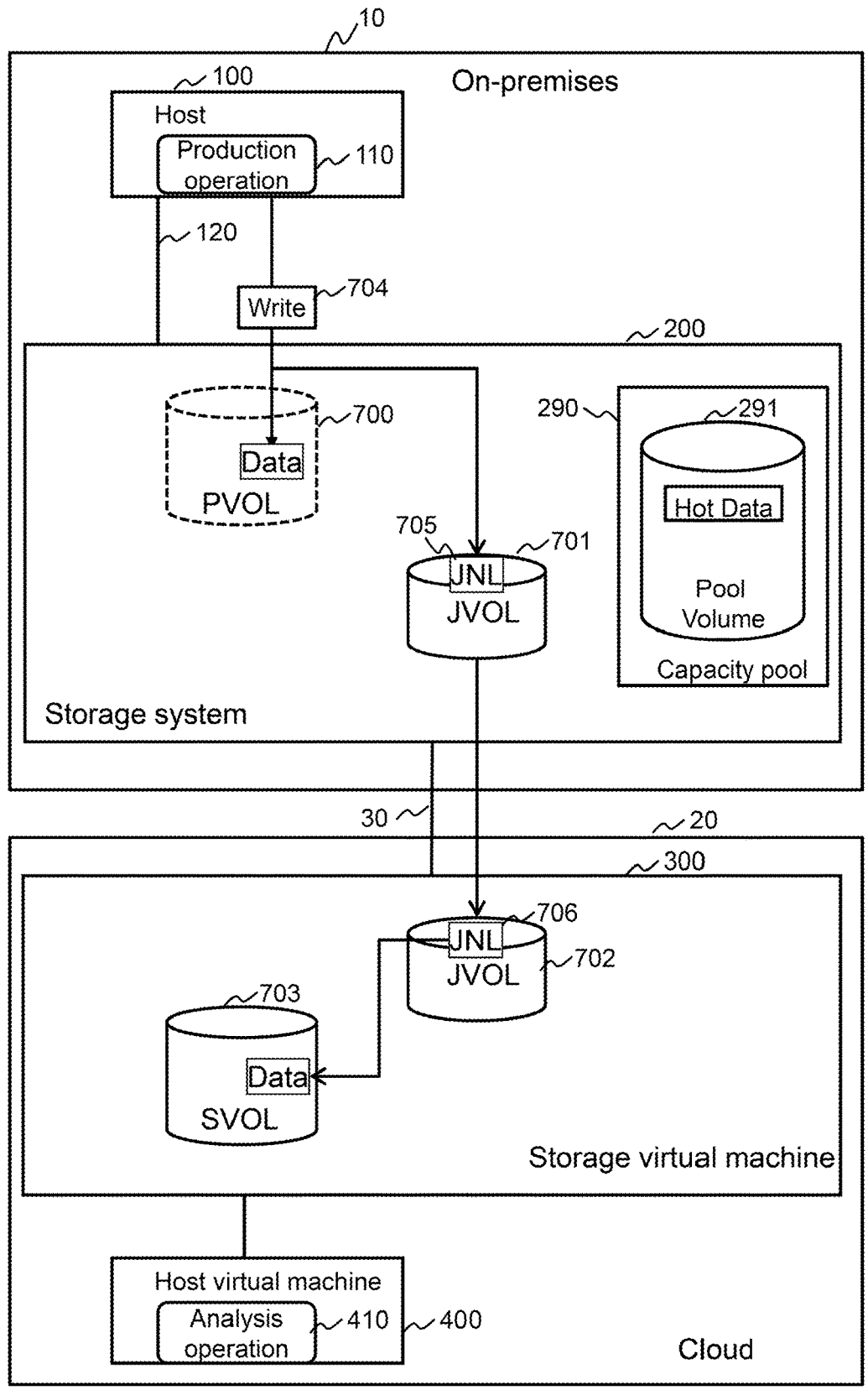
FIG. 14 is a diagram illustrating a computer system according to Embodiment 2.

FIG. 14 illustrates a configuration of a computer system according to Embodiment 2.

The computer system according to the present embodiment creates a PVOL (primary volume) 700, an SVOL (secondary volume) 703, a JVOL (journal volume) 701, and a JVOL 702 instead of the virtual volume 293 and the volume 310. The PVOL 700 is a virtual volume of the storage system 200 in the on-premises 10, and stores data used by the host 100. The SVOL 703 is a volume of the storage VM 300 in the cloud 20, and stores a copy of data written to the PVOL 700.

The JVOL 701 is a volume of the storage system 200 in the on-premises 10, and temporarily stores data to be transferred to the SVOL 703. The JVOL 702 is a volume of the storage VM 300, and temporarily stores data transferred from the storage system 200 in the on-premises 10. The JVOLs 701 and 702 may both be a virtual volume. The JVOL, which is a volume in the present embodiment, may be any area that can temporarily store data, and a cache may be used for example.

Data transferred from the JVOL 701 to the JVOL 702 is referred to as a journal. The journal includes write data (journal data) and metadata (journal control block: JNCB) corresponding to the write data. The JNCB includes a write address, a volume number of a copy destination, an identification number of a copy destination storage, information (SEQ ID) indicating the order of writing from the host, and the like.

A flow in a case where a write is issued from the host 100 to the PVOL 700 for the asynchronous remote copy is described below. Processing executed when the asynchronous remote copy is applied to the present invention is described with reference to FIG. 16 and after.

Upon receiving a writer request 704 from the host 100, the storage system 200 writes the write data to the PVOL 700. Then, the storage system 200 creates a journal 705 (including a SEQ ID) for the write request, and stores the journal 705 in the JVOL 701, and issues the write completion report to the host 100. The storage system 200 and the storage VM 300 transfers data on the JVOL 701 to the JVOL 702 at a timing not synchronized with that of the write completion report. As a final step, the storage VM 300 extracts write data from the journal in the JVOL 702, and writes the write data to the SVOL 703 in accordance with the order of the SEQ ID. This processing is referred to as JNL restore.

The JVOL 701 may include a plurality of volumes, and store the journal corresponding to the plurality of PVOLs 700. The same applies to the JVOL 702.

Figure 15:
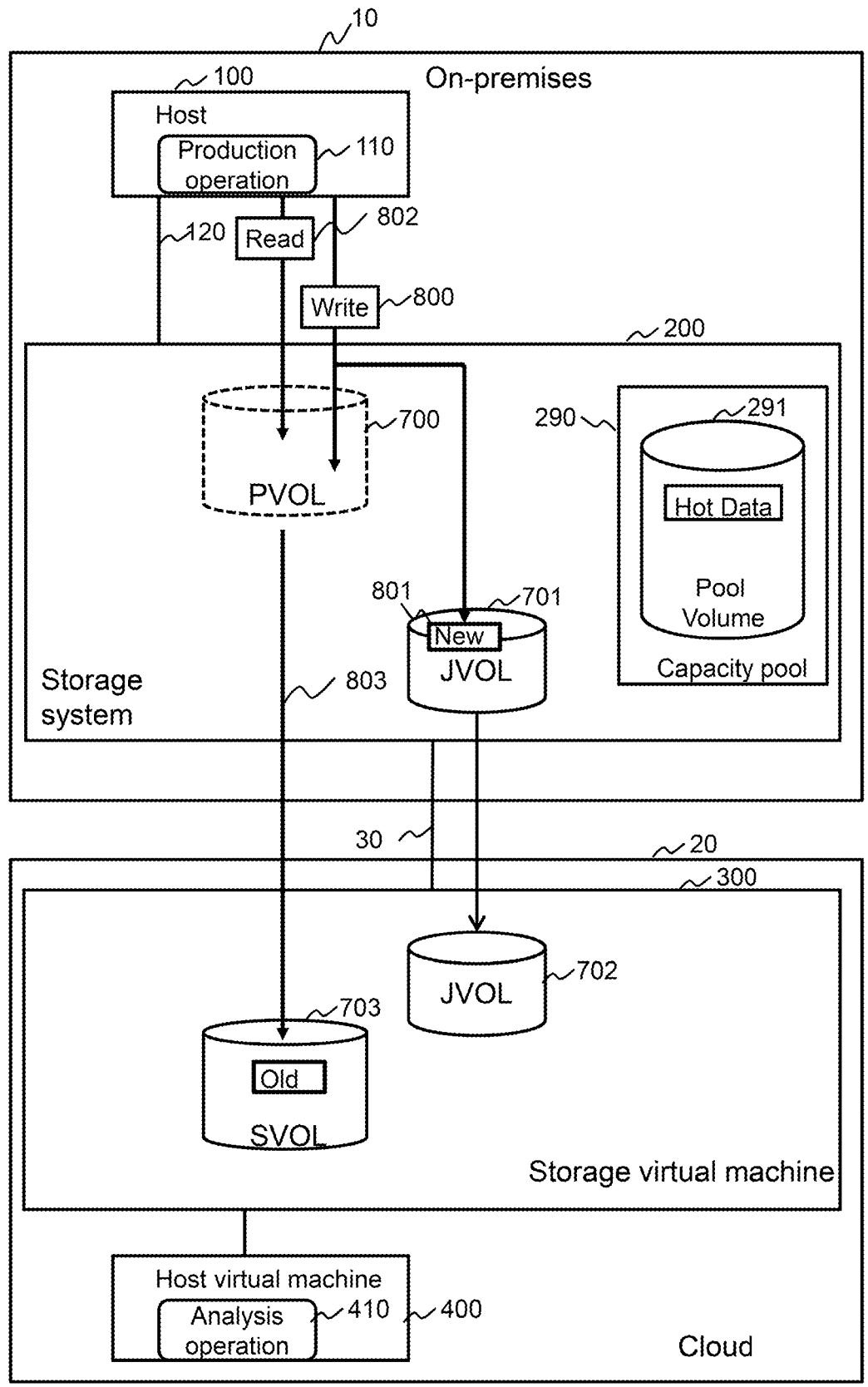
FIG. 15 is a diagram illustrating an example of asynchronous remote copy.

FIG. 15 illustrates an example of a problem that occurs when data is transferred from the storage system 200 to the storage VM 300 with asynchronous remote copy.

It is assumed that the storage system 200 is received the write request 800 from the host 100, and the journal 801 is created for the write request. In the figure, "New" indicates newly written data, and "Old" indicates a value that has been stored in the address to which "New" is written.

While the journal 801 including the write data "New" is stored in the JVOL 701 or the JVOL 702, a read request 802, for the same address as the write request, might be issued from the host 100.

When the data corresponding to the target address is Cold Data, with the read program 514 according to Embodiment 1, data is read from the SVOL 703 in the cloud 20, and is transferred to the host. However, "Old" is still stored in the cloud 20, and thus the storage system 200 might transfer this old data to the host 100.

A table structure and a processing flow for solving this problem are described below.

To solve the problem described above, the storage system 200 according to the present embodiment makes the write data resident in the cache of the storage system 200, until the journal restore in the SVOL 703 is completed. Thus, the storage system 200 accesses "New" stored in the cache in response to the read request 802, and thus the problem of reading "Old" is solved.

The cache management table 226 according to the present embodiment includes a resident Bit 226e and a largest SEQ ID 226f.

The resident Bit 226e is for managing information indicating whether the cache data needs to be resident in the cache section. More specifically, "ON" indicates that the resident is required, and "OFF" indicates that the resident is not required. The resident Bit is set to be ON until the restore is completed so that the problem of reading the old data can be solved.

The largest SEQ ID 226f is for managing the largest one of the SEQ IDs allocated to the write data stored in the cache. The storage system 200 determines whether the cache is to be released, by comparing the largest SEQ ID with the SEQ ID of the journal that has been successfully restored in the SVOL 703.

The largest SEQ ID is used because of the reason described below. Specifically, when a plurality of write requests are issued to the same address, the cache data is rewritten. When the storage system 200 releases the cache at the point when the journal corresponding to the first one of the write requests is written to the SVOL, the data cached with the subsequent write requests are also released. To avoid this, the storage system 200 manages the largest SEQ ID.

The program section 222 of the storage system 200 stores a journal transfer program 521 and a cache purge program 522, in addition to the programs in Embodiment 1.

The cloud 20 stores a read journal program and a restore program. The storage VM 300 executes these programs.

Figure 16:
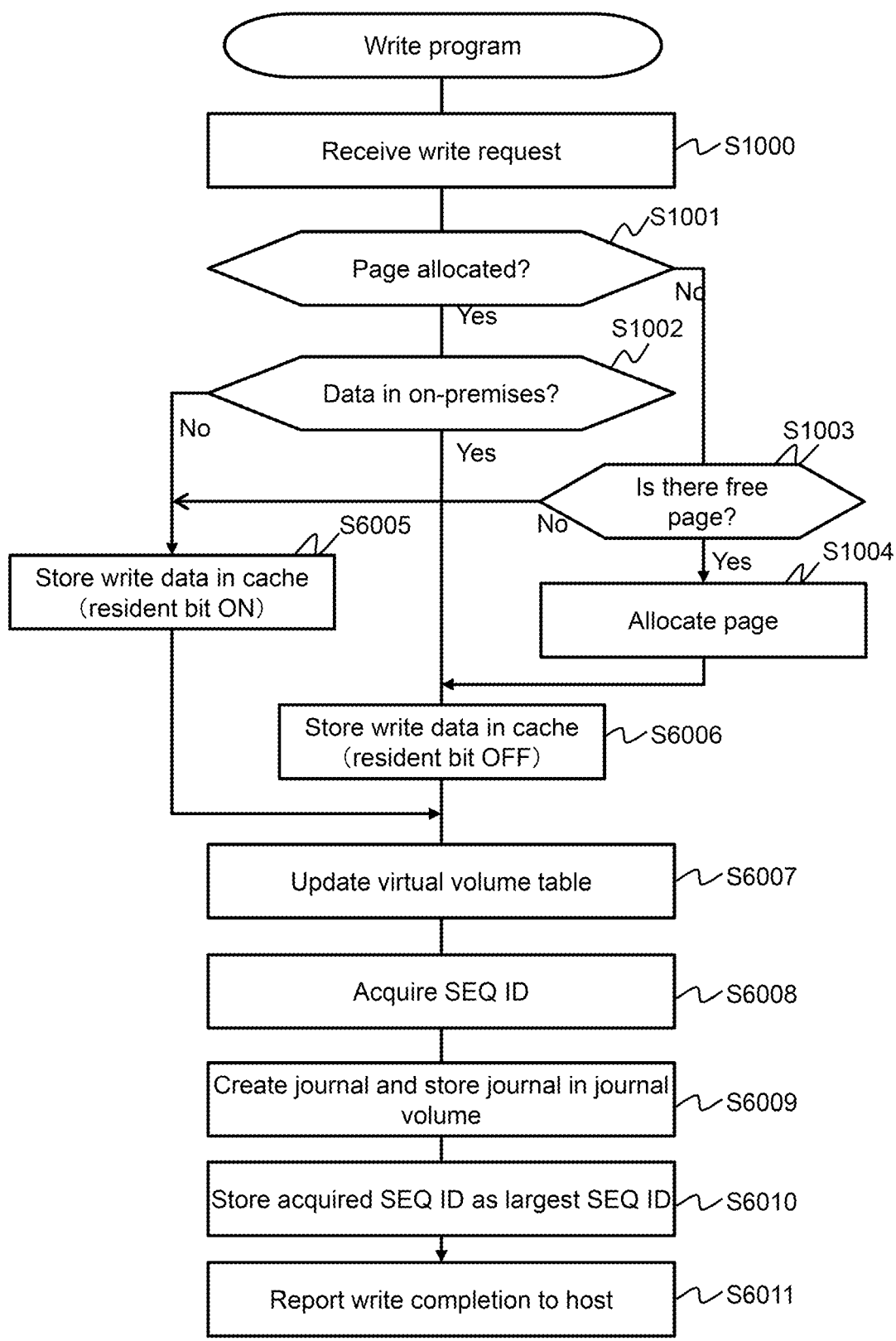
FIG. 16 is a flowchart illustrating an example of a write program according to Embodiment 2.

FIG. 16 is a flowchart illustrating an example of a write program according to Embodiment 2.

A write program 515b represents the write program in the present embodiment. S1000 to S1004 in the write program 515b according to the present embodiment is the same as those in the write program 515 according to Embodiment 1. The write program 515b stores write data in a cache, when a result of the determination in S1002 is "No" or when a result of the determination in S1003 is "No" (S6005). In this process, the write program 515b sets the resident Bit 226e in the cache management table 226 to be "ON".

In this case, the processing is branched for storing data only in the storage VM 300 of the cloud 20. Thus, the write data needs to be resident in the cache. Thus, the write program 515b sets the resident Bit 226e in the cache management table 226 to be "ON".

The write program 515b stores an upper limit value, as a largest possible value of the SEQ ID, in the largest SEQ ID 226f of the cache management table 226. This is because the SEQ ID is allocated in step S6008 executed later, and thus no SEQ ID has been acquired for the write request. Any value can be set as long as the cache release can be prevented until the SEQ ID is determined. The write program 515b may store an invalid value instead of the upper limit value, with the cache release not occurring when the invalid value is stored.

Furthermore, the SEQ ID may be acquired before S6005 or S6006 in which the write data is stored in the cache. In such a case, the acquired SEQ ID is compared with a value in the largest SEQ ID 226f. When the acquired SEQ ID is larger, the acquired SEQ ID is stored in the largest SEQ ID 226f of the cache management table 226.

When a result of the determination in S1002 is "Yes" or a result of the determination in S1003 is "Yes", the write program 515b stores the write data in the cache (S6006). In this case, the resident Bit 226e of the cache management table 226 is "OFF". This is because an area in the capacity pool 290 has been allocated, and thus the latest data can be transferred from the capacity pool 290 in response to the read request, even when the cache is released. In this case, the write program 515b stores nothing in the largest SEQ ID 226f. An example of the cache management table 226 illustrated in the figure has "-" representing the largest SEQ ID 226f in this case.

After S6005 and S6006, the write program 515b updates the virtual volume table 225 (S6007). This processing is same as in S1008 in Embodiment 1.

Next, the write program 515b acquires the SEQ ID from the SEQ ID management table (S6008), creates the journal including the SEQ ID, and stores the journal in the JVOL 701 (S6009).

After storing the journal, the write program 515b stores the acquired SEQ ID in the largest SEQ ID 226f of the cache management table 226 (S6010).

Finally, the write program 515b issues the write completion report to the host 100, and terminates the processing (S6011).

The SEQ ID is information indicating the order of the write data written to the storage system 200 from the host 100. The SEQ ID management table manages the number in such a manner that a number is allocated to the acquired request and then is incremented. Thus, the number incremented by one is allocated to the request acquired next. The SEQ ID management table is recorded in the control information section 221.

A series of SEQ IDs are managed for a PVOL group including at least one PVOL requiring a guaranteed order. This group is generally referred to as a consistency group.

For deleting data cached in the storage system 200 with the resident Bit being ON, the SEQ ID of the journal successfully restored in the SVOL 703 is required. This SEQ ID is referred to as a restored SEQ ID. The restored SEQ ID is created by the storage VM 300 of the cloud 20 including the SVOL 703. Thus, the storage system 200 in the on-premises 10 needs to be notified of the restored SEQ ID. The restored SEQ ID is recorded in the control information sections 221. The restored SEQ ID is recorded in the control information sections 221 in both of the storage system 200 and the storage VM 300. A restored SEQ ID created by processing described later is recorded in the storage VM 300. The restored SEQ ID transferred from the storage VM 300 is recorded in the storage system 200.

The transferring of the restored SEQ ID is described in combination with the description of the processing of the asynchronous remote copy.

Figure 17:
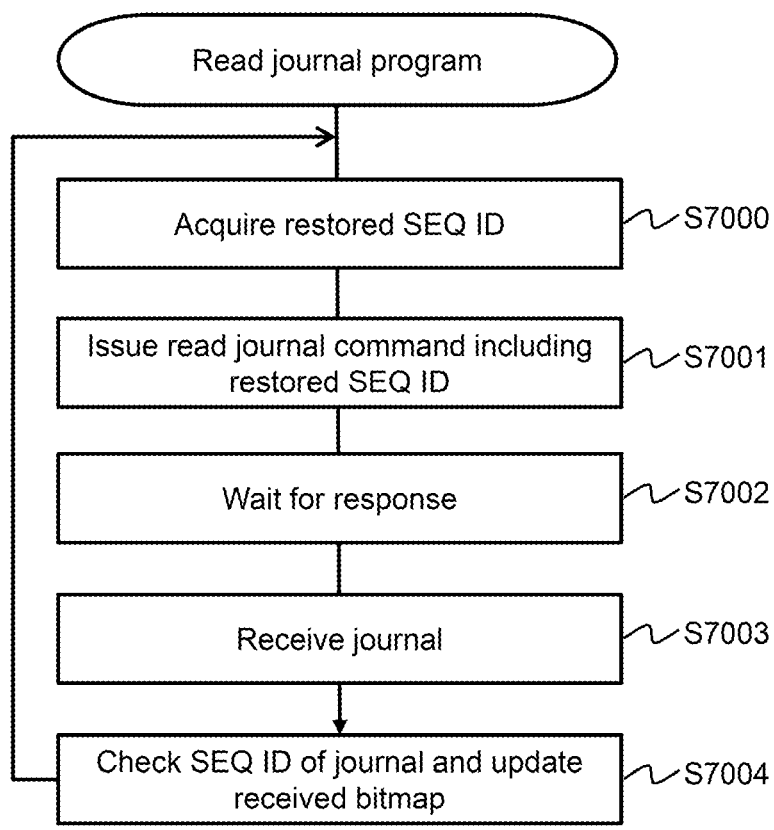
FIG. 17 is a flowchart illustrating an example of a read journal program according to Embodiment 2.

FIG. 17 is a flowchart illustrating an example of a read journal program according to Embodiment 2.

The read journal program is executed in the storage VM 300 as a copy destination in the asynchronous remote copy. The read journal program is for issuing a read journal command to the storage system 200 as a copy source, and for transferring the journal stored in the JVOL 701 to the JVOL 702. The read journal program may correspond to multi-operations.

First of all, the read journal program acquires the restored SEQ ID stored in the storage VM 300 as the copy destination (S7000). The restored SEQ ID is updated by a restore program described later in accordance with the progress of restore processing.

Next, the read journal program issues a read journal command to the storage system 200 as the copy source (S7001), and waits for a response from the storage system 200 as the copy source (S7002). This command includes the restored SEQ ID acquired in S7000.

The read journal program receives the journal from the storage system 200 as the copy source (S7003). The storage system 200 can transfer a plurality of journals for a single read journal command.

As a final step, the read journal program checks the SEQ ID in the journal, and updates a received SEQ ID bit map (S7004). The received SEQ ID bit map is control information indicating the SEQ ID that is received by the storage VM 300 as the copy destination, and is used for determining a journal that can be restored by the restore program. The received SEQ ID bit map is recorded in the control information section 221.

After S7004, the read journal program returns to S7000 to issue the read journal command, and executes the transferring of another journal. Processing of sleeping for a predetermined time when a report indicating that there is not journal is received from the storage system 200 as the copy source, may be added after S7004. Furthermore, multiplicity of the read journal programs concurrently executed may be lowered.

Figure 18:
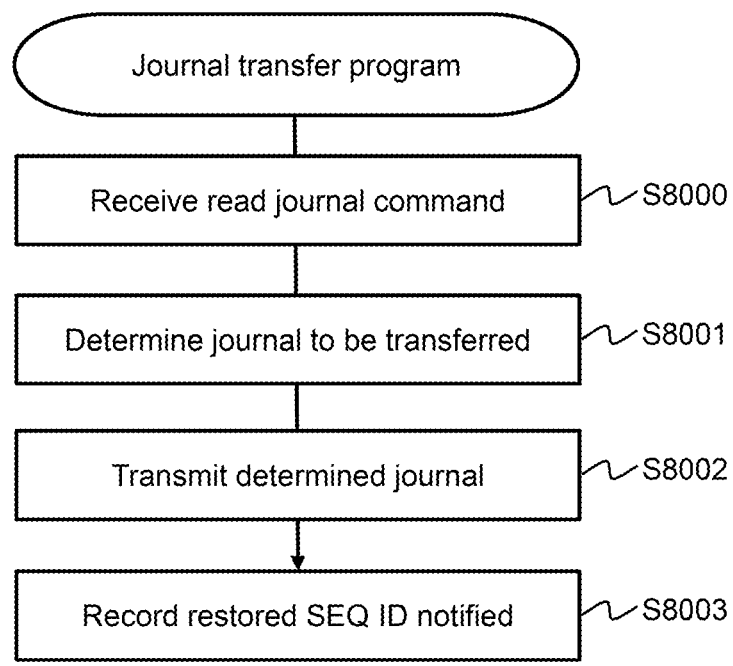
FIG. 18 is a flowchart illustrating an example of a journal transfer program according to Embodiment 2.

FIG. 18 is a flowchart illustrating an example of the journal transfer program 521 according to Embodiment 2.

The journal transfer program 521 is executed in the storage system 200 as the copy source in the asynchronous remote copy. More specifically, the journal transfer program 521 receives the read journal command from the storage VM 300 as the copy destination, and transmits the journal, transferred from the JVOL 701, to the storage VM 300 as the copy destination.

First of all, upon receiving the read journal command (S8000), the journal transfer program 521 determines a journal to be transferred (S8001).

Next, the journal transfer program 521 reads the journal thus determined from the JVOL 701, and transmits the journal to the storage as the copy destination (S8002).

As the final step, the journal transfer program 521 records the restored SEQ ID, notified from the read journal program, in the storage system 200 as the copy source (S8003). The restored SEQ ID recorded in the storage system 200 as the copy source is used by a cache purge program described later. The restored SEQ ID is recorded in the control information section 221.

In the present embodiment, the asynchronous remote copy is executed with the read request issued by the storage VM 300 as the copy destination to the storage system 200 as the copy source. It is a matter of course that the asynchronous remote copy can be performed with the write request issued by the storage system 200 to the storage VM 300. In this configuration, the storage VM 300 can notify the storage system 200 of the restored SEQ ID as a response value for the write request. Furthermore, a configuration in which the storage VM 300 periodically notifies the storage system 200 of the restored SEQ ID, or the other like configuration may be employed.

Figure 19:
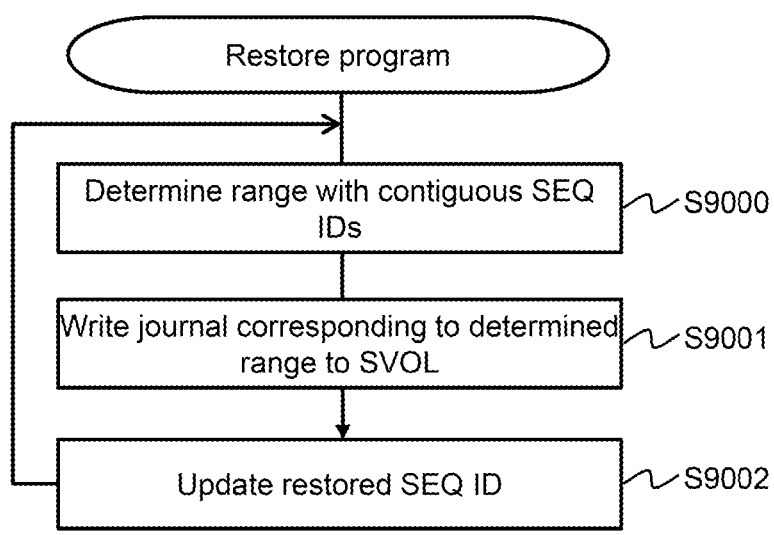
FIG. 19 is a flowchart illustrating an example of a restore program according to Embodiment 2.

FIG. 19 is a flowchart illustrating an example of the restore program according to Embodiment 2.

The restore program is executed in the storage VM 300 as the copy destination in the asynchronous remote copy. The restore program is for achieving restoring of a journal from the JVOL 702 to an SVOL.

First of all, the restore program checks the received SEQ ID bit map, and identifies a range where SEQ IDs are contiguous with one another without a break (S9000). Thus, all the journals in the range are received by the storage VM 300.

Next, the restore program restores to the SVOL the journals in the determined range in accordance with the order of the SEQ ID (S9001). More specifically, the restore program writes data in the journals to the SVOL. The SVOL as the write destination and the address information on the SVOL are stored in the JNCB in the journal, and thus the processing is executed with reference to the JNCB.

As the final step, the restored SEQ ID is updated (S9002). This means that the SEQ ID of the last restored journal is written to the restored SEQ ID in the control information section of the storage VM 300.

After S9002, the restore program returns to S9000, and executes restoring for the next journal.

Figure 20:
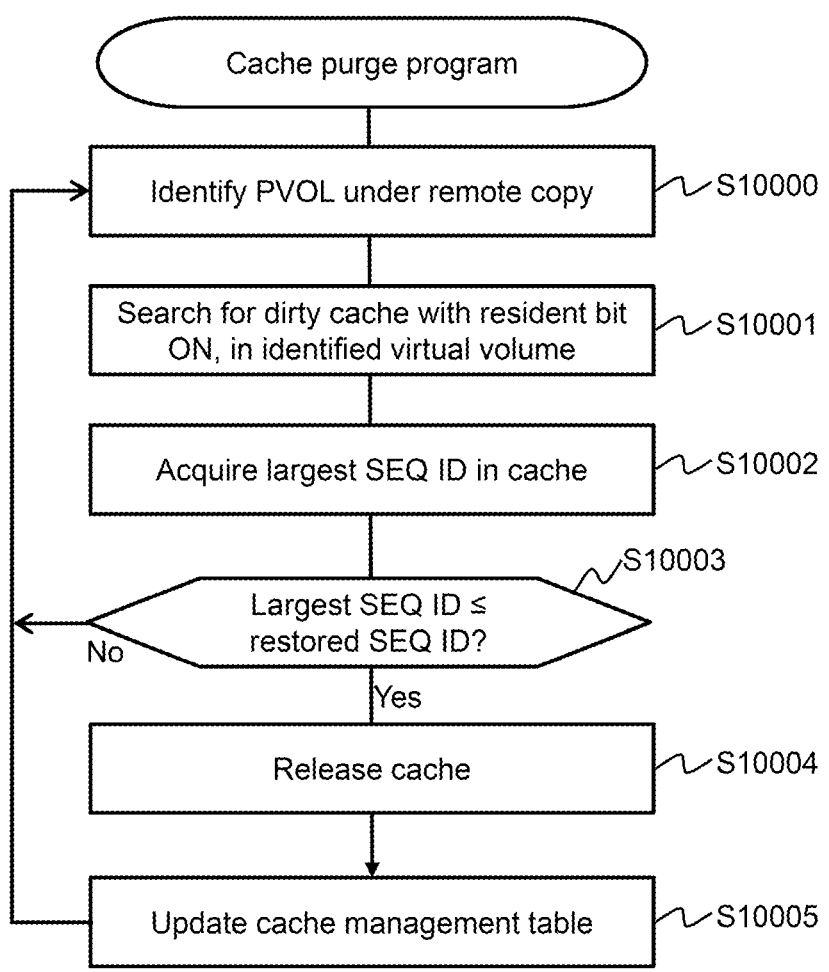
FIG. 20 is a flowchart illustrating an example of a cache purge program according to Embodiment 2.

FIG. 20 is a flowchart illustrating an example of the cache purge program according to Embodiment 2.

The cache purge program 522 is executed in the storage system 200 as the copy source in the asynchronous remote copy. The cache purge program 522 determines whether the cache with ON in the resident Bit 226e can be discarded, and discards the cache that can be discarded.

First of all, the cache purge program 522 identifies the PVOL 700 under remote copy to the cloud 20 (S10000). Next, the cache purge program 522 searches the caches the identified PVOLs 700 fora dirty cache with ON in the resident Bit 226e (S10001). The cache purge program 522 acquires the largest SEQ ID, for the cache thus found, by referring to the cache management table 226 (S10002), and compares the largest SEQ ID with the restored SEQ ID (S10003).

When the largest SEQ ID is equal to or smaller than the restored SEQ ID, the cache purge program 522 releases the cache (S10004), and updates the cache management table 226 (S10005). Specifically, the cache purge program 522 deletes the record for managing this cache from the cache management table 226, and puts the cache address to a free state.

When the largest SEQ ID is larger than the restored SEQ ID, the cache purge program 522 cannot release the cache, and thus skips S10004 and S10005.

After S10005 or when a result of the determination in S10003 is "No", the cache purge program 522 returns to S10000, and executes the processing from S10001 on another cache data.

In the example illustrated in FIG. 20, the cache purge program 522 is periodically executed for releasing the cache. Alternatively, the cache purge program may be called by the destage program when a dirty cache with ON in the resident Bit is found, to execute steps S10002 to S10005.

In the present embodiment, the storage system 200 and the storage VM 300 may store all the pieces of data written to the PVOL 700 in the SVOL 703 by executing the asynchronous remote copy. The storage system 200 receives completion information, indicating the order of journals reflected to the SVOL 703 by the storage VM 300, from the storage VM 300. Then, the storage system 200 maintains data, in data in the cache, not reflected on the SVOL 703 according to the completion information. Thus, the storage system 200 can prevent data that is not updated from being read from the cloud 20.

Embodiment 3

An external storage connection function is used for mapping a volume in an external storage to an upper level storage to be used as a virtual volume of the upper level storage. The volume mapped to the upper stage storage may be provided to the host by the upper level storage. The upper level storage consumes no capacity of the physical storage device. Upon receiving an IO request from the host, the upper level storage issues the IO request to the external storage, whereby the IO request is implemented. Generally, a cache of the upper level storage can be used. The storage system 200 according to the present embodiment uses the external storage connection function as the upper level storage.

Figure 21:
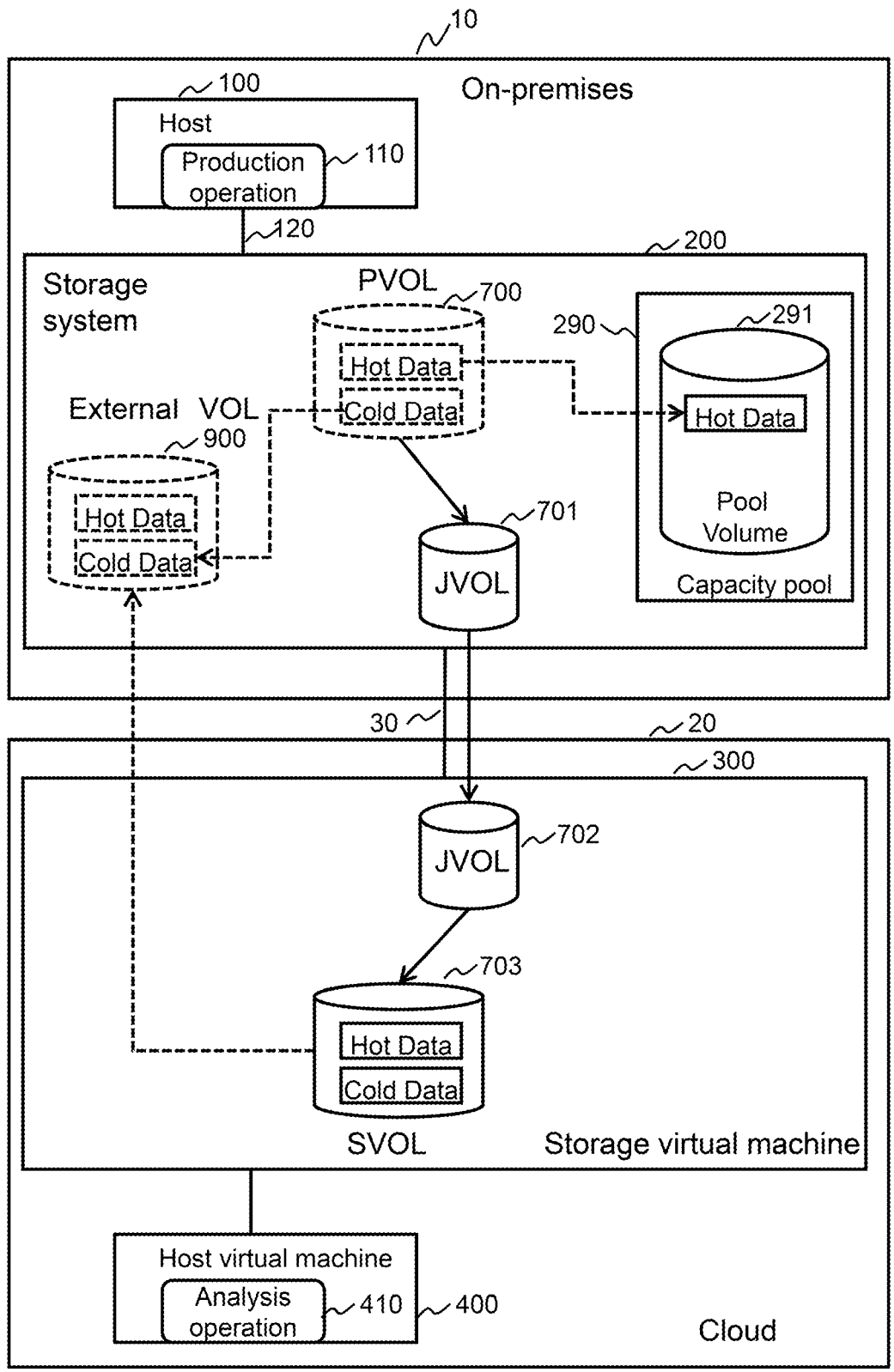
FIG. 21 is a diagram illustrating a configuration of a computer system according to Embodiment 3.

FIG. 21 illustrates a configuration of a computer system according to Embodiment 3.

The storage system 200 according to the present embodiment uses what is known as an external storage connection function (also referred to as a device virtualization function) with the volume 703 of the storage VM 300 in the cloud 20 mapped as an external VOL 900 of the storage system 200 in the on-premises 10.

Processing methods for a read request and a write request employed in the storage system 200 according to the present embodiment will be described.

The processing method for the write request is similar to or the same as the write program 515b in Embodiment 2. The processing method for the read request is implemented in the read program 514 in which the processing in S2004 and S2005, in which the read request is issued to the volume 310 in the cloud 20, is replaced with processing of issuing the read request to the external VOL. An IO request is issued to the PVOL 700, and thus the storage system 200 processes the read request with the address of the PVOL 700 replaced with the address of the external VOL 900. The storage system 200 can read data from the volume 703 in the cloud by operating the read processing of the external storage connection function. In this manner, the storage system 200 can process the read request with the external storage connection function.

The computer system according to the present embodiment may employ the synchronous remote copy described in Embodiment 1.

In the embodiments described above, both Hot Data and Cold Data are stored in the cloud 20. As described above, the storage system 200 as the copy source continuously transmits write received from the host 100 to the cloud 20. The storage VM 300 writes the write data to the SVOL 703 in accordance with an order in which the write is received by the storage system 200 as the copy source. Thus, the SVOL 703 is constantly consistent. Thus, when the storage system 200 of the on-premises 10 fails, the operation can be immediately continued by using the storage VM 300 in the cloud 20.

The computer system according to the embodiments described above continues to transmit write data from the on-premises 10 to the cloud 20, and thus a very small amount of data is lost by the disaster (excellent RPO (recovery point objective)). When a snapshot image of the copy source storage is periodically transferred to the cloud as in a conventional technique, a large amount of data is lost by the disaster (bad RPO). When the data in the cloud is rewritten by periodic differential copy, the data in the cloud becomes inconsistent when a failure occurs in the differential copy, and thus the operation cannot be recovered. When the data in the cloud is not rewritten by the differential copy, the differential copy needs to be performed with another area, and thus the cloud is required to have an extra capacity.

In the embodiments described above, another operation can be executed by the host VM 400 in the cloud 20. For example, analysis processing, a test/development operation, or the like may be executed in the cloud.

The snapshot is applied to the SVOL in the cloud to acquire a still image. Another operation may be executed on the snapshot data.

Other use case of the present invention includes ROBO (remote office and branch office). In such a case, the on-premises 10 serves as remote office or branch office, and the cloud 20 serves as a core data center. The storage VM 300 in the cloud 20 collectively manages data in the plurality of remote offices or branch offices. A cost for the remote office or the branch office can be reduced. The analysis operation executed in the cloud includes an analysis using data from a plurality of offices. A POS system may be a use case that is the same as or similar to the ROBO.

In the embodiments described above, the copy destination of the data in the on-premises 10 is the storage VM 300 in the cloud 20. Alternatively, the copy destination may be a physical storage system that is similar to or the same as the storage system 200. Furthermore, the storage system on the on-premises side may be the storage VM 300 formed in the cloud as the copy destination or in different cloud.

In the embodiments described above, the storage system 200 in the on-premises 10 provides the virtual volume to the host 100. Upon receiving the write request from the host 100, the physical storage areas in both the on-premises 10 and the cloud 20 are updated when an access frequency of the area including the write target address is high, and the physical storage area only in the cloud 20 is updated when the access frequency of the area including the write target address is low.

Thus, an amount of data stored in the on-premises 10 can be reduced and thus the storage cost can be reduced, and an operation using data stored in the cloud 20 can be implemented, without compromising the performance of the operation executed in the on-premises 10.

The storage system may include the storage system 200 or the other. A other storage system may be the cloud 20, the storage VM 300 or the like. The processor may include the processor 211, or the like. The memory may include the memory unit 220 or the like. The storage device may include the physical storage device 240 or the like. The first volume may include the virtual volume 293, the PVOL 700, or the like. The second volume may include the volume 310, the SVOL 703, or the like. The first storage system may include the storage system 200 or the like. The second storage system may include the cloud 20, the storage VM 300, or the like.

It is a matter of course that the present invention is not limited to the embodiments described above, and can be modified in various ways without departing from the gist of the present invention.

REFERENCE SIGNS LIST

10 On-premises
20 Cloud

30 Network
100 Host
110 Production operation
120 Network
200 Storage system
211 Processor
220 Memory unit
240 Physical storage device
270 Maintenance terminal
290 Capacity pool
291 Pool volume
293 Virtual volume
300 Storage virtual machine
310 Volume
400 Host virtual machine
410 Analysis operation

The invention claimed is:

1. A storage system coupled to another storage system via a network, the storage system comprising:
a first storage area;
a first volume that, in response to data being stored in the first storage area, is created as a virtual volume of a second volume in the another storage system, the second volume comprising a second storage area, the first volume and the second volume each comprising a plurality of areas that store the data;
a memory; and
a processor configured to:
associate the second volume with the first volume;
access the second volume;
determine whether to store data in the first volume or the second volume based on access frequencies of the data;
when an access frequency of an area is high, store data having high access frequency in both of the first volume and the second volume;
when the access frequency of the area is low, store data not having high access frequency in the second volume instead of the first volume;
based on the plurality of areas in the first volume and the second volume, store in the first storage area a portion of the data stored in the first volume and the second volume, while not storing data to the first storage area;
in response to receiving a write request for writing data to the first volume, write that data to the first volume;
in response to receiving when the processor receives a read request for data stored in the first volume:
when data according to the read request is stored in the first storage area, read out the data from the first storage area,
when data according to the read request is not stored in the memory or the first storage area, read out from the second volume, and
send data according to the read out to a request source of the read request.

2. The storage system according to claim 1, wherein when another work different from work of reading out data from the first volume is performed, a snapshot of the first or second volume is obtained and a read or write as the another work is performed for the snapshot where write data of the work is not written.

3. The storage system according to claim 1, wherein the processor is configured to send data according to the read request to the request source and store data according to the read request in the memory of the storage system as a cache when the processor reads out according to the read request to data stored in the first storage area or the second volume.

4. The storage system according to claim 3, wherein data according to the read request, read out from the second volume, is stored in the first storage area of the storage system.

5. The storage system according to claim 1, wherein the storage system is an on-premises storage system and the other storage system is a cloud storage system.

6. The storage system according to claim 5, wherein the storage system and the other storage system is a combination of an on-premises storage system and a cloud storage system; and
the cloud storage system is configured by use of a virtual machine and a storage service.

7. The storage system according to claim 1, wherein the storage system is a cloud storage system and the other storage system is an on-premises storage system.

8. The storage system according to claim 1, further comprising:
in response to reversing a determination to not store data to the first storage area, transferring data that was not stored to the first storage area to the first storage area, wherein the transferring moves the data from the second volume to the first volume and stores the data to the first storage area; and
in response to a change in a storage status of data from being stored in the first storage area to not being stored therein, not storing that data to the first storage area.

9. The storage system according to claim 8, wherein the processor is configured to determine whether to store data in the first storage area based on access frequency of the area of the first volume.

10. The storage system according to claim 8, further comprising storing data related to a write process in the first storage area when the write process is performed in an area of the first volume that is stored and not stored in the first storage area.

11. The storage system according to claim 8, further comprising cache-storing data related to a write process in the first volume when performing write process in an area that is not stored in the first storage area.

12. The storage system according to claim 8, further comprising:
storing data related to a write process in the first storage area when performing a write process in a storage area that is designated to be stored in the first storage area; and
not storing data related to the write process in the first storage area when performing write process in the first storage area that is not stored in the first storage area.

13. The storage system according to claim 8, wherein the second volume in the another storage system is directly accessible from the host.

14. A control method for storage systems coupled via a network, the method comprising:
providing a first storage that is accessible by a first host and that comprises a first volume, a first storage area, and a memory;
providing a second storage that is accessible by a second host and that comprises a second volume and a second storage area, wherein:
the second storage, in response to receiving a write request from the second host, stores data in the second storage area, and
the first volume is created, in response to data being stored in the first storage area, as a virtual volume of the second volume in the second storage area, the first volume and the second volume each comprising a plurality of areas that store the data;

associating the second volume with the first volume;

based on the plurality of areas in the first volume and the second volume, storing in the first storage area a portion of the data stored in the first volume and the second volume, while not storing data to the first storage area, wherein:

determining whether to store data in the first volume or the second volume based on access frequencies of the data;

when an access frequency of an area is high, data having high access frequency is stored in both of the first volume and the second volume; and when the access frequency of the area is low, data not having high access frequency is stored in the second volume instead of the first volume;

in response to a first host issuing a read request to the first volume to access the data, performing steps comprising:

in response to the data being stored in the first storage area, reading the data from the first storage area; and in response to the data not being stored in the memory or the first storage area, reading the data from the second storage area.

15. The control method according to claim 14, wherein the host accesses both the first volume and the second volume.

16. The control method according to claim 14, further comprising storing a part of data among data stored in the first volume in the first storage area and not storing other data.

17. The control method according to claim 14, further comprising communicating the data to a source of the read request.

18. A storage system comprising:
a first storage that is accessible by a first host and that comprises a first volume, a first storage area, and a memory;
a second storage coupled to the first storage via a network, the second storage comprising a second volume and a second storage area and being accessible by a second host, the second storage is configured to store data in the second storage area in response to receiving a write request from the second host, and the first volume, created as a virtual volume of the second volume, in response to storing the data in the second storage area the first volume and the second volume each comprising a plurality of areas that store the data; and
a processor configured to:
create the first volume in response to the data being stored in the second storage area, the first volume and the second volume each comprising a plurality of areas that store the data;
associate the second volume with the first volume;
determine whether to store data in the first volume or the second volume based on access frequencies of the data;
when an access frequency of an area is high, store data having high access frequency in both of the first volume and the second volume;
when the access frequency of the area is low, store data not having high access frequency in the second volume instead of the first volume;
based on the plurality of areas in the first volume and the second volume, store in the first storage area a portion of the data stored in the first volume and the second volume, while not storing data to the first storage area;
in response to a first host issuing a read request to the first volume to access the data, perform steps comprising:
in response to the data being stored in the first storage area, reading the data from the first storage area; and
in response to the data not being stored in the memory or the first storage area, reading the data from the second storage area.

19. The storage system according to claim 18, wherein the processor is configured to store data stored in the first volume and the second volume.

20. The storage system according to claim 18, wherein the processor is configured to, when receiving a write request to the first volume, store data according to the write request to the first volume, and store data stored in the first volume in the first storage area.

21. The storage system according to claim 20, wherein the other work is analysis process or test/development work.

* * * * *